(12) United States Patent
Hong et al.

(10) Patent No.: US 10,958,428 B2
(45) Date of Patent: Mar. 23, 2021

(54) APPARATUS FOR QUANTUM KEY DISTRIBUTION ON A QUANTUM NETWORK AND METHOD USING THE SAME

(71) Applicant: ELECTRONICS AND TELECOMMUNICATIONS RESEARCH INSTITUTE, Daejeon (KR)

(72) Inventors: Chang-Ho Hong, Seoul (KR); Na-Young Kim, Seoul (KR); O-Sung Kwon, Daejeon (KR); Youn-Chang Jeong, Ulsan (KR); Haeng-Seok Ko, Daejeon (KR); Jin-Gak Jang, Daejeon (KR); Dae-Sung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 185 days.

(21) Appl. No.: 15/350,376

(22) Filed: Nov. 14, 2016

(65) Prior Publication Data
US 2017/0338952 A1    Nov. 23, 2017

(30) Foreign Application Priority Data
May 20, 2016 (KR) .......... 10-2016-0061993

(51) Int. Cl.
*H04L 9/08* (2006.01)
*H04L 9/00* (2006.01)

(52) U.S. Cl.
CPC .......... *H04L 9/0858* (2013.01); *H04L 9/083* (2013.01)

(58) Field of Classification Search
CPC ....... H04L 9/0858; H04L 9/06; H04L 9/0643; H04L 9/08; H04L 9/0861; H04L 9/0852;
(Continued)

(56) References Cited

U.S. PATENT DOCUMENTS 7,496,203 B2 * 2/2009 Choi ............... H04L 9/0852
380/263
7,889,868 B2 * 2/2011 Wellbrock ........ H04L 9/0858
380/263
(Continued)

FOREIGN PATENT DOCUMENTS

KR       10-0596404 B1     7/2006
KR    10-2011-0057448 A    6/2011
(Continued)

*Primary Examiner* — Shewaye Gelagay
*Assistant Examiner* — Kevin Ayala
(74) *Attorney, Agent, or Firm* — LRK Patent Law Firm

(57) ABSTRACT

A device and method for quantum key distribution (QKD). The QKD center includes an authentication key sharing unit for sharing authentication keys with QKD client devices; a quantum key generation unit for generating a sifted key for each of the QKD client devices using a quantum state; an error correction unit for generating output bit strings by correcting errors of the sifted keys; and a bit string operation unit for calculating an encryption bit string by performing a cryptographic operation on the authentication keys, the distribution output bit strings and output bit strings received from the QKD client devices. The present invention improves security by preventing the QKD center from being aware of keys shared among users.

15 Claims, 11 Drawing Sheets

(58) Field of Classification Search
CPC ......... H04L 9/0819; H04L 9/085; H04L 9/32;
H04L 9/0855; H04L 2209/34; H03M
11/14; H04B 10/70
USPC ....................................................... 380/279
See application file for complete search history.

(56) References Cited

U.S. PATENT DOCUMENTS

| | | | |
|---|---|---|---|
| 8,639,927 B2 | 1/2014 | Choi et al. | |
| 8,681,982 B2 | 3/2014 | Wiseman et al. | |
| 9,519,796 B1 * | 12/2016 | Loughlin-McHugh | ...................... G06Q 20/045 |
| 2006/0056630 A1 * | 3/2006 | Zimmer | ................. B82Y 10/00 380/256 |
| 2007/0230688 A1 * | 10/2007 | Tajima | ................. H04L 9/0858 380/30 |
| 2008/0147820 A1 * | 6/2008 | Maeda | ................. H04L 9/0858 709/213 |
| 2013/0101121 A1 * | 4/2013 | Nordholt | ............... H04L 9/0852 380/279 |
| 2013/0315395 A1 * | 11/2013 | Jacobs | .................. H04L 9/0852 380/278 |
| 2014/0372812 A1 * | 12/2014 | Lutkenhaus | .......... H04L 9/0855 714/57 |
| 2015/0215122 A1 * | 7/2015 | Takahashi | ............. H04L 9/0855 380/283 |
| 2015/0222619 A1 * | 8/2015 | Hughes | ................... H04L 63/08 713/168 |
| 2015/0349920 A1 * | 12/2015 | Stolitzka | ........... H03M 13/2906 714/776 |
| 2016/0071081 A1 | 3/2016 | Zheng et al. | |

FOREIGN PATENT DOCUMENTS

| | | |
|---|---|---|
| KR | 10-2014-0054647 A | 5/2014 |
| KR | 10-2015-0145238 A | 12/2015 |

* cited by examiner

APPARATUS FOR QUANTUM KEY DISTRIBUTION ON A QUANTUM NETWORK AND METHOD USING THE SAME

CROSS REFERENCE TO RELATED APPLICATION

This application claims the benefit of Korean Patent Application No. 10-2016-0061993 filed May 20, 2016, which is hereby incorporated by reference in its entirety into this application.

BACKGROUND OF THE INVENTION

1. Technical Field

The present invention relates to technology for securing a quantum key generated in a Quantum Key Distribution (QKD) system.

2. Description of the Related Art

A QKD system is configured such that, when a transmission unit transmits a randomly selected quantum state using two nonorthogonal bases, a reception unit receives it and estimates the quantum state using a randomly selected a measurement basis of two bases. Such a QKD system may provide an environment in which secure key distribution is guaranteed because an eavesdropper may be detected in the process of estimating the quantum state.

A QKD system has a limitation as to distance when the system is implemented. In order for two users, father farther apart from each other than the allowable distance, to share encryption keys using a QKD system, a method in which encryption keys are relaxed by a quantum repeater or a trustworthy key distribution center is used. Here, because it is not easy to implement a quantum repeater, a method for relaying encryption keys through a key distribution center is widely used. In this method, encryption keys, individually created by a key distribution center and users, are delivered to users. However, this method is problematic in that a security weak point exists in that the key distribution center is aware of the encryption keys shared among the users.

Meanwhile, Korean Patent Application Publication No. 10-2011-0057448, titled "A method of user-authenticated quantum key distribution", discloses a method for authenticating a quantum channel by sharing a position having the same basis without disclosing information about the basis using previously shared secret keys and checking whether there is the same measured outcome at that position in order to guarantee unconditional security of BB84 QKD protocol, which is vulnerable to man-in-the-middle attacks.

This invention was supported by the ICT R&D program of MSIP/IITP [1711028311, Reliable crypto-system standards and core technology development for secure quantum key distribution network] and the R&D Convergence program of NST (National Research Council of Science and Technology) of Republic of Korea (Grant No. CAP-18-08-KRISS).

SUMMARY OF THE INVENTION

An object of the present invention is to improve the security of quantum key distribution by preventing information about the encryption of quantum keys, which are finally distributed to quantum key distribution client devices, from being exposed to a quantum key-distribution center.

Another object of the present invention is to improve the security of quantum key distribution through the process of a cryptographic operation on au authentication key, shared among client devices, and an output bit string, in which an error is corrected.

A further object of the present invention is to distribute a quantum key encrypted with a hash function having improved security.

In order to accomplish the above objects, a QKD center on a quantum network according to an embodiment of the present invention includes an authentication key sharing unit for sharing authentication keys with QKD client devices; a quantum key generation unit for generating sifted keys, corresponding to the QKD client devices, using quantum states; an error correction unit for generating distribution output bit strings by correcting errors of the sifted keys; and a bit string operation unit for calculating an encryption bit string by performing a cryptographic operation on the authentication keys and the distribution output bit strings corresponding to the QKD client devices.

Here, the quantum key generation unit may randomly select bases for quantum states, corresponding to the QKD client devices, using quantum mechanics, compare measurement bases for quantum states, received from the QKD client devices, generate sifted keys, corresponding to bits that remain after checking security of a channel using bits on the same basis, for the respective QKD client devices.

Here, the error correction unit may generate distribution output bit strings by correcting the errors of the sifted keys. The error correction unit may correct the errors of the sifted keys using Hamming code, Winnow algorithm, LDPC or the like.

Here, the bit string operation unit is configured to prove the identity of the QKD center by transmitting a result of a cryptographic operation performed on the first authentication key and the first distribution output bit string to the QKD client device.

Here, the bit string operation unit is configured to prove the identity of the QKD center by transmitting a result of a cryptographic operation performed on the second authentication key and the second distribution output bit string to the QKD client device.

Here, the bit string operation unit may transmit the encryption bit string, calculated by performing a cryptographic operation on the second authentication key, the first distribution output bit siring and the second distribution output bit string, to any one of the first QKD client device and the second QKD client device only when authentication of the QKD center succeeds.

Also, in order to accomplish the above object, a QKD client device on a quantum network according to an embodiment of the present invention includes an authentication key sharing unit for sharing authentication keys with a QKD center and an additional QKD client device; a quantum key generation unit for generating a sifted key, corresponding to the QKD center, using a quantum states; an error correction unit for generating output bit strings by correcting an error of the sifted key in conjunction with the QKD center; a bit string calculation unit for calculating a shared key bit string by performing a cryptographic operation on one or more of a first output bit string, a second output bit string of the additional QKD client device, an inter-client authentication key, which is included in the authentication key and is shared with the additional QKD client device, and an encryption bit string received from the QKD center and a privacy amplification unit for generating a final key bit string by applying a hash function to the shared key bit string.

Here, the quantum key generation unit may select a measurement basis for a quantum state, corresponding to the QKD center, using quantum mechanics, compares a preparation basis for a quantum state, received from the QKD center, and generate a sifted key corresponding to bits that remain after checking security of a channel using bits on the same basis.

Here, the error correction unit may generate output bit strings by correcting the errors of the sifted keys. The error correction unit may correct the errors of the sifted keys using Hamming code, Window algorithm, LDPC or the like.

Here, the bit string calculation unit may authenticate the QKD center to a first QKD client device by comparing a result of a cryptographic operation performed on a first authentication key, which is shared with the first QKD client device, and a first distribution output bit string with a result of a cryptographic operation performed on the first authentication key and a first output bit string, the first authentication key being included in the authentication keys, the first distribution output bit string being included in the distribution output bit strings, and the first output bit string being included in the output bit strings.

Here, the bit string calculation unit may authenticate the QKD center to a second QKD client device by comparing a result of a cryptographic operation performed on a second authentication key, which is shared with the second QKD client device, and a second distribution output bit string with a result of a cryptographic operation performed on the second authentication key and a second output bit string, the second authentication key being included in the authentication keys, the second distribution output bit string being included in the distribution output bit strings, and the second output bit string being included in the output bit strings.

Here the privacy amplification unit may generate a final key bit string by applying a hash function. The privacy amplification unit may delete some of information about a key, leaked to an eavesdropper in the process of error correction.

Here, only when the authentication of the QKD center succeeds and the QKD client device requests the QKD center to communicate, the bit string calculation unit may receive the encryption bit siring, which is calculated by performing a cryptographic operation on the second authentication key, the first distribution output bit string and the second distribution output bit string, the distribution output bit strings being generated by correcting an error of the sifted key in the QKD center.

Here, only when the authentication of the QKD center succeeds and the QKD client device requests the QKD center to communicate the bit string calculation unit may calculate an encrypted shared key by performing a cryptographic operation on the encryption bit string, the second authentication key and the second output bit string.

Here, only when the authentication of the QKD center succeeds and the QKD client device requests the QKD center to communicate, the bit string calculation unit may calculate the shared key bit string by performing a cryptographic operation on the encrypted shared key and the inter-client authentication key.

Here, only when the authentication of the QKD center succeeds and the QKD client device is requested to communicate by the QKD center, the bit string calculation unit may calculate the shared key bit siring by performing a cryptographic operation on the first output bit string and the inter-client authentication key.

Also, in order to accomplish the above objects, a QKD method on a quantum network according to an embodiment of the present invention includes sharing authentication keys among the QKD center and the QKD client devices; generating sifted keys, corresponding to the QKD center and the QKD client devices, using quantum states; generating output bit strings by correcting errors of the sifted keys; calculating a shared key bit string by performing a cryptographic operation on the output bit strings and an inter-client authentication key; and generating a final key bit string by applying a hash function to the shared key bit string.

Here, the generating the sifted keys may be configured to select a preparation basis and a measurement basis for a quantum state using quantum mechanics, to compare a preparation basis of the QKD center with measurement basis of the QKD client devices, and to generate the sifted keys corresponding to bits that remain after checking security of a quantum channel using bits on the same basis.

Here, the generating output bit strings creates the output bit strings by correcting the errors of the sifted keys. The error correction methods use Hamming code, Winnow algorithm, LDPC or the like.

Here, the calculating the shared key bit string may include calculating an encryption bit string by the QKD center; calculating, by the QKD client device that requests communication, the shared key bit string; and calculating, by the QKD client device that is requested to communicate, the shared key bit string.

Here, the calculating the encryption bit string may be configured to transmit the encryption bit string, calculated using a result of a cryptographic operation performed on the second authentication key and the distribution output bit strings, to any one of the QKD client devices only when authentication of the QKD center succeeds.

Here, the calculating, by the QKD client device that requests communication, the shared key bit string may be configured such that only when authentication of the QKD center succeeds and any one of the QKD client devices requests the QKD center to communicate, the QKD client device that requests communication receives the encryption bit siring and calculates an encrypted shared key by performing a cryptographic operation on the received encryption bit string, the second authentication key and the second output bit string, generated by the QKD client device that requests communication.

Here, the calculating, by the QKD client device that requests communication, the shared key bit string may be configured such that only when authentication of the QKD center succeeds and any one of the QKD client devices requests the QKD center to communicate, the shared key bit siring is calculated by performing a cryptographic operation on the encrypted shared key and the inter-client authentication key, which is included in the authentication keys and shared among the QKD client devices.

Here, the calculating, by the QKD client device that is requested to communicate, the shared key bit string may be configured such that only when authentication of the QKD center succeeds and any one of the QKD client devices is requested to communicate by the QKD center, the shared key bit string is calculated by performing a cryptographic operation on the first output bit string, generated by the QKD client device that is requested to communicate, and the inter-client authentication key.

Here, the generating a final key bit string may be calculated by performing a hash function on the shared key bit string.

Here, the QKD center may not be aware of the shared key bit string, shared among the QKD client devices.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
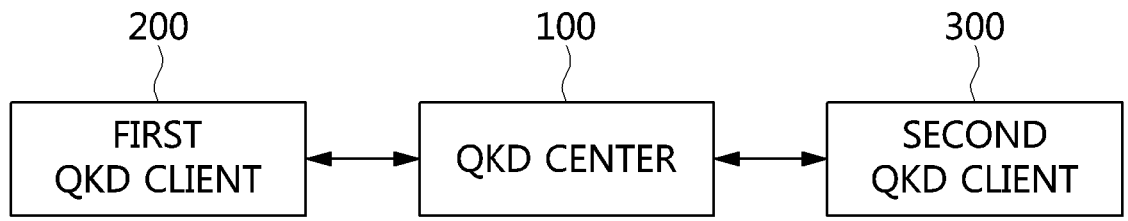
FIG. 1 is a block diagram illustrating a simple quantum key distribution (QKD) system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 2:
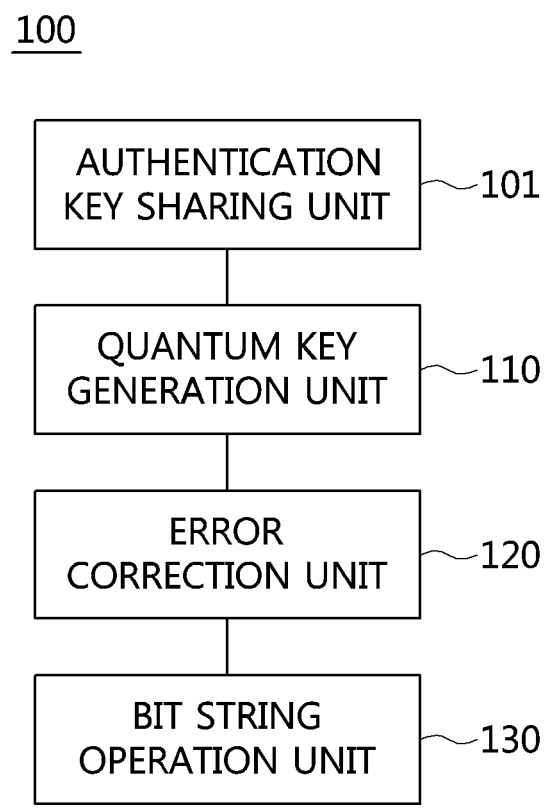
FIG. 2 is a block diagram illustrating an example of the QKD center illustrated in FIG. 1.
Figure 3:
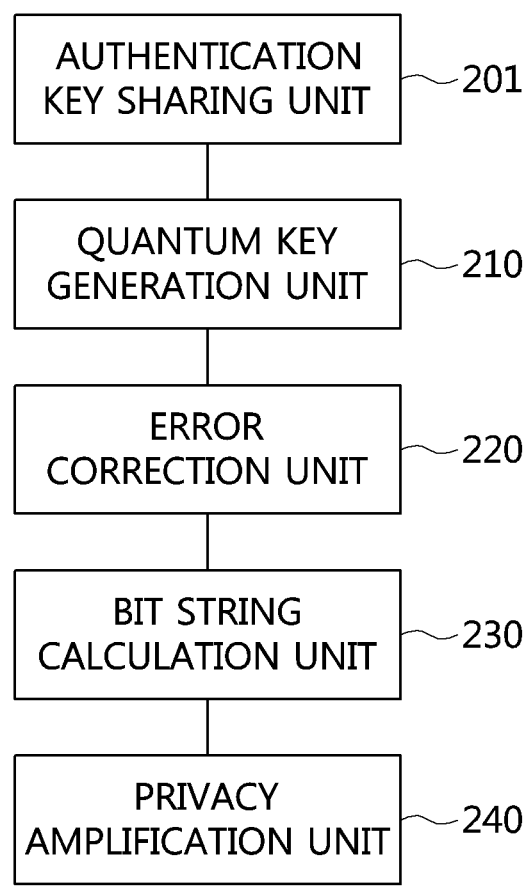
FIG. 3 is a block diagram illustrating an example of the QKD client device illustrated in FIG. 1.
Figure 4:
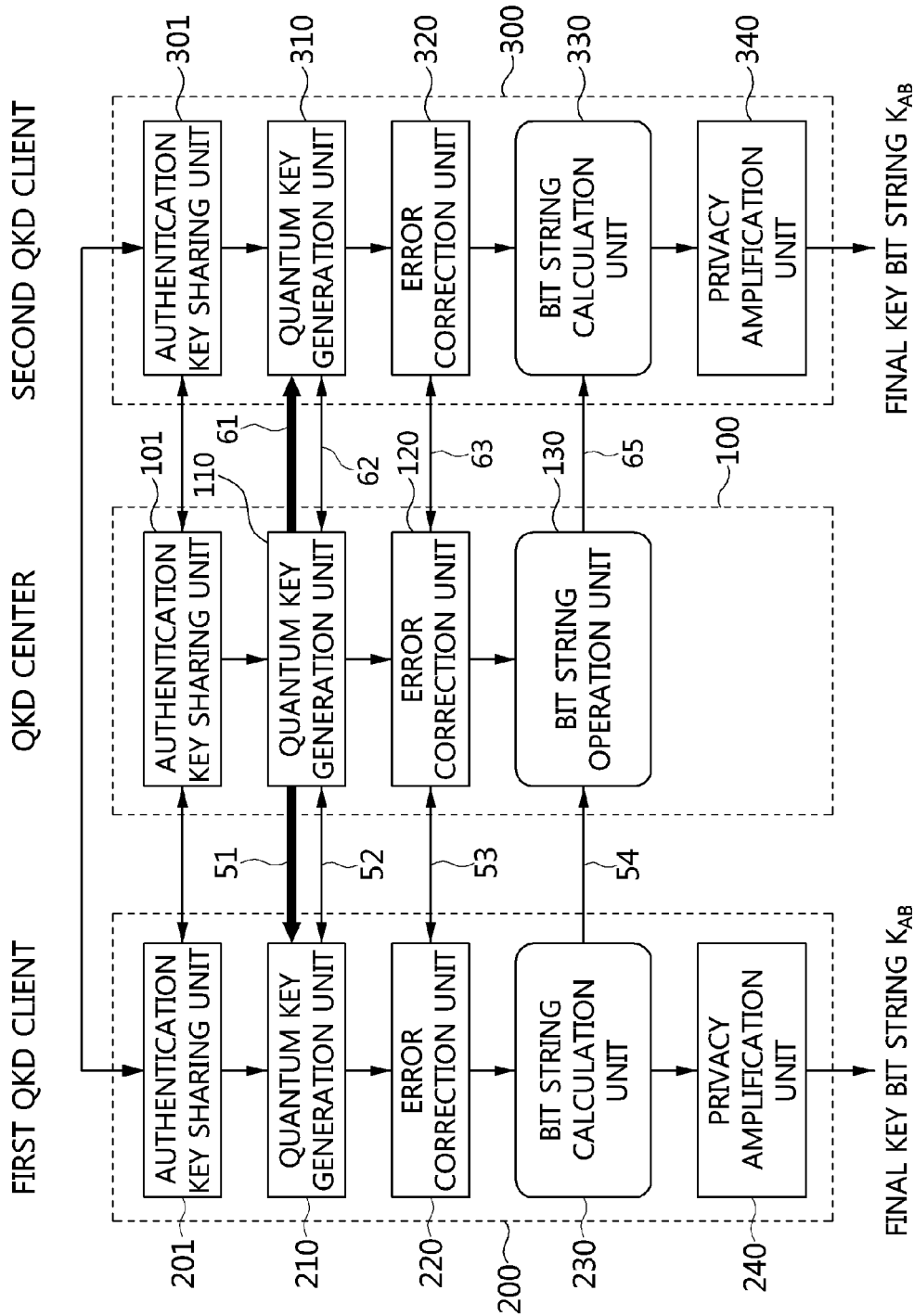
FIG. 4 is a block diagram illustrating an example of the QKD system illustrated in FIGS. 1 to 3.

FIG. 1 is a block diagram illustrating a QKD system according to an embodiment of the present invention. FIG. 2 is a block diagram specifically illustrating an example of the QKD center illustrated in FIG. 1. FIG. 3 is a block diagram specifically illustrating an example of the QKD client device illustrated in FIG. 1. FIG. 4 is a block diagram specifically illustrating an example of the QKD system illustrated in FIGS. 1 to 3.

Referring to FIGS. 1 to 4, a QKD system according to an embodiment of the present invention includes a QKD center 100, a first QKD client device 200, and a second QKD client device 300.

The QKD center 100 may share authentication keys and keyed hash functions with the QKD client devices 200 and 300 in advance.

Here, the QKD center 100 may share a first authentication key and keyed hash function with the first QKD client device 200, and may share a second authentication key and keyed hash function with the second QKD client deice 300.

Here, the QKD center 100 may generate sifted keys, corresponding to the QKD client devices, using quantum states.

Here, the QKD client device 200 and 300 may authenticate the QKD center 100, and the QKD center 100 may open a communication channel in response to a request by an authenticated user. Here, in order to authenticate the QKD center, the authentication keys shared with the QKD client devices, the output bit strings, the distribution output bit strings, and keyed hash functions may be used.

The QKD center 100 may generate distribution output bit strings by correcting the errors of the sifted keys. The distribution output bit strings may include a first distribution output bit string and a second distribution output bit string, wherein the first distribution output bit string is acquired in such a way that the QKD center 100 corrects the error of the sifted key, which is generated corresponding to the first QKD client device 200 and the second distribution output bit string is acquired in such a way that the QKD center 100 corrects the error of the sifted key, which is generated corresponding to the second QKD client device 300.

The QKD center 100 may calculate an encryption bit string by performing a cryptographic operation on the second authentication key, shared with the QKD client 300, and the distribution output bit strings, acquired by correcting the errors.

Here, the QKD center 100 may transmit the encryption bit string to the QKD client device that requests communication.

The first QKD client device 200 may be the QKD client device that is requested to communicate by the second QKD client device 300.

The first QKD client device 200 may share authentication keys and keyed hash function with the QKD center 100 and the second QKD client device 300, and may generate a sifted key corresponding to the QKD center 100, using a quantum state.

Here, the first QKD client device 200 may share a first authentication key and keyed hash function with the QKD center 100.

Here, the first QKD client device 200 may share an inter-client authentication key and a hash function with the second QKD client device 300.

Here, the shared authentication keys, the sifted key, and a keyed hash function may be used for user authentication.

The first QKD client device 200 may generate a first output bit string by correcting the error of the sifted key corresponding to the QKD center 100.

The first QKD client device 200 may calculate a shared key bit string by performing a cryptographic operation on the first output bit string and the inter-client authentication key, which is shared with the second QKD client device 300.

The first QKD client device 200 may generate a final key bit string by applying a hash function to the shared key bit string.

The second QKD client device 300 may be the QKD client device that requests the first QKD client device 200 to communicate therewith.

The second QKD client device 300 may share authentication key with the QKD center 100 and the first QKD client device 200, and may generate a sifted key, corresponding to the QKD center 100, using a quantum state.

Here, the second QKD client device 300 may share a second authentication key and keyed hash function with the QKD center 100.

Here, the second QKD client device 300 may share an inter-client authentication key and a hash function with the first QKD client device 200.

Here, the shared authentication keys, the output bit strings, and a keyed hash function may be used for authentication of the QKD center.

The second QKD client device 300 may generate a second output bit string by correcting the error of the sifted key corresponding to the QKD center 100.

The second QKD client device 300 may calculate a shared key bit string by performing a cryptographic operation on the second output bit string, the inter-client authentication key and the encryption bit string, which is received from the QKD center 100.

The second QKD client device 300 may generate a final key bit string by applying a hash function to the shared key bit string.

Referring to FIG. 2 and FIG. 4, a QKD center according to an embodiment of the present invention includes an authentication key sharing unit 101, a quantum key generation unit 110, an error correction unit 120, and a bit string operation unit 130.

The authentication key sharing unit 101 may share authentication keys with QKD client devices. Here, the authentication key sharing unit 101 may share a first authentication key $Ak_A$ with the first QKD client device 200 and may share a second authentication key $Ak_B$ with the second QKD client device 300.

The quantum key generation unit 110 may generate sifted keys, corresponding to the QKD client devices, using quantum states.

Here, the quantum key generation unit 110 may include a quantum state transmission unit 111, a random number generator 112, a classical bit transceiver 113, and a logic control unit 114.

The quantum state transmission unit 111 may prepare a quantum state and transmit it via a quantum channel 51. Here, the quantum state transmission unit 111 may transmit the quantum state through a quantum key distribution protocol such as BB84, B92, or the like.

The random number generator 112 may generate a random signal using quantum mechanics. Here, the random number generator 112 may randomly select a quantum preparation basis (polarization basis) and quantum states.

The classical bit transceiver 113 may receive the measurement basis selected by the random number generator 212 of the first QKD client device 200, and may transmit the preparation basis, selected by the random number generator 112.

Here, the logic control unit 114 checks the security of the quantum channel 51 by sharing the information about polarizing plates (preparation bases and measurement bases) with the first QKD client device 200 is a classical channel 52, and may then transmit the information that remains after checking the security of the quantum channel to the error correction unit 120). Here, the classical channel 52 may be a public channel and may be eavesdropped on by anybody. However, in the classical channel 52, falsification and the addition of additional information may not be allowed. For example, the classical channel 52 may correspond to the concept of a public board such as a newspaper. Here, the classical bit transceiver 113 may guarantee the integrity of information using Message Authentication Code (MAC).

Here, the logic control unit 114 may store information in order to compare the preparation basis for a quantum state, which is randomly selected by the random number generator 112, with the measurement basis for a quantum state, which is randomly selected by the random, number generator 212 of the first QKD client device 200.

Here, the logic control unit 114 compares the preparation basis for the quantum state with the measurement basis for the quantum state through communication between the classical bit transceiver 113 and the classical bit transceiver 213 of the first QKD client device 200, and may check whether a channel is secure using some bits of the bit string on the same basis.

Here, the logic control unit 114 may output a sifted key based on the bits remaining after checking the security of the channel.

The above-mentioned process of generating the sifted key, performed by the quantum key generation unit 110, may be applied not only to the first QKD client device 200 but also to the second QKD client device 300.

The error correction unit 120 may generate distribution output bit strings by correcting the errors of the sifted keys. Here, the error correction unit 120 may correct the errors of the sifted keys using Hamming code, Winnow algorithm, LDPC or the like. Specifically, the error correction unit 120 divides the bit string to be transmitted into multiple blocks, and may transmit the parity bit of each of the blocks to the error correction unit 220 or 320 of the QKD client device via the classical channel 53 or 63. The error correction unit 220 or 320 of the QKD client device may detect a block containing a data, error by checking the parity bit of the block. Then, the error correction unit 120 subdivides the block contain big the data, error, which is detected and announced by the error correction unit 220 or 320 of the QKD client device, and the parity of the subdivided block is repeatedly checked by the error correction unit 220 or 320 of the QKD client device. Through the repetition of this process, when the length of the block containing the parity error becomes the length to which Hamming code can be applied, the bit containing the error may be determined and corrected by applying Hamming code thereto. Here, the bit string generated by this error-correction process may correspond to a common output bit string between the error correction unit 120 and the error correction unit 220 of the first QKD client device 200 or a common output bit string between the error correction unit 120 and the error correction unit 320 of the second QKD client device 300.

Here, the error correction unit 120 may output a first distribution output bit string $Rk_A'$ by correcting the error of the sifted key corresponding to the first QKD client device 200.

Here, the error correction unit 120 may output a second distribution output bit string $Rk_B'$ by correcting the error of the sifted key corresponding to the second QKD client device 300.

Here, the error correction unit 220 of the first QKD client device 200 may output a first output bit string $Rk_A$ by correcting the error of the sifted key corresponding to the QKD center 100.

Here, the error correction unit 320 of the second QKD client device 300 may output a second output bit string $Rk_B$ by correcting the error of the sifted key corresponding to the QKD center 100.

The bit siring operation unit 130 may prove the identity of the QKD center by transmitting a result of a cryptographic operation performed on the first authentication key and the first distribution output bit string to the QKD client device.

The bit string operation unit 130 may prove the identity of the QKD center by transmitting a result of a cryptographic operation performed on the second authentication key and the second distribution output bit string to the QKD client device.

The bit siring operation unit 130 may calculate an encryption bit string by performing a cryptographic operation on the second authentication key and the distribution output bit strings in which the error has been corrected.

The bit string operation unit 130 may transmit the encryption bit string, calculated by performing a cryptographic operation on the second authentication key, the first distribution output bit string and the second distribution output bit string, to any one of the first QKD client device and the second QKD client device only when authentication of the QKD center succeeds.

Here, the bit string operation unit 130 authenticates own identity to the QKD client devices, and may open a communication channel in response to the requests by users (QKD clients). Here, in order to prove own identity, the authentication keys, the distribution output bit strings, output bit strings, and a keyed hash function may be used.

The bit string operation unit 130 may include memory units 131 and 132 and an operation unit 135.

The memory unit 131 may store the first distribution output bit string $Rk_A'$, which is received from the error correction unit 120. Here, the memory unit 231 may receive a bit string, acquired by performing an operation on the first authentication key $Ak_A$ and the first distribution output bit string $Rk_A'$, from the QKD center 100 via a channel 54, and may store the received bit string therein for a authentication of the QKD center 100.

Here, the operation unit 232 may authenticate the QKD center 100 by comparing the result of a cryptographic operation performed on the first authentication key $Ak_A$ and the first distribution output bit string $Rk_A'$ with the result of a cryptographic operation performed on the first authentication key $Ak_A$ and the first output nit string $Rk_A$ using Equation (1). Here, the operation unit 232 may authenticate the QKD center 100 using a keyed hash function with the first authentication key $Ak_A$.

$$h_{AkA}(Rk_A) = h_{AkA}(Rk_A') \quad (1)$$

The memory unit 132 may store the second distribution output bit string $Rk_B'$, which is received from the error correction unit 120. Here, the memory unit 331 may receive a bit string, acquired by performing an operation on the second authentication key $Ak_B$ and the second distribution output bit string $Rk_B'$, from the QKD center 100 via a classical channel 64, and may store the received bit string therein for a authentication of the QKD center 100.

Here, the operation unit 332 may authenticate the QKD center 100 by comparing the result of a cryptographic operation performed on the second authentication key $Ak_B$ and the second distribution output bit string $Rk_B'$ with the result of a cryptographic operation performed on the second authentication key $Ak_B$ and the second output bit string $Rk_B$ using Equation (2). Here, the operation unit 332 may authenticate the QKD center 100 using a keyed hash function with the second authentication key $Ak_B$.

$$h_{AkB}(Rk_B) = h_{AkB}(Rk_B') \quad (2)$$

Here, the operation unit 135 may generate an encryption bit string by performing a cryptographic operation on the second authentication key $Ak_B$, the first distribution output bit string $Rk_A'$ and the second distribution output bit string $Rk_B'$ using Equation (3) only when authentication of the QKD center 100 succeeds.

$$(Rk_A' \oplus Rk_B') \| h_{AkB}(Rk_A' \oplus Rk_B') \quad (3)$$

where $\oplus$ may correspond to an XOR operation, $\|$ may correspond to a concatenation and $h_{AkB}$ may correspond to a keyed hash function using the second authentication key $Ak_B$.

The operation unit 135 may calculate the encryption bit string by performing an XOR operation and a keyed hash function on the first distribution output bit string $Rk_A'$ and the second distribution output bit string $Rk_B'$.

Here, the operation unit 135 may transmit the encryption bit string to the QKD client device that requests communication. According to an embodiment of the present invention, the QKD client device that requests communication may be the second QKD client device 300.

Here, the operation unit 135 may transmit the encryption bit string to the operation unit 332 of the second QKD client device 300 via a classical channel 65.

Referring to FIGS. 3 and 4, the first QKD client device 200 according to an embodiment of the present invention includes an authentication key sharing unit 201, a quantum key generation unit 210, an error correction unit 220, a bit string calculation unit 230, and a privacy amplification unit 240.

Here, the components of the first QKD client device 200 may correspond to the components of the second QKD client device 300.

Here, according to an embodiment of the present invention, the first QKD client device 200 may be the QKD client device that is requested to communicate, and the second QKD client device 300 may be the QKD client device that requests communication.

The authentication key sharing unit 201 may share authentication keys with the QKD center and other QKD client device. Here, the authentication key sharing unit 201 may share the first authentication key $Ak_A$ with the QKD center 100, and may share an inter-client authentication key $Ak_{AB}$ with the second QKD client device 300.

Here, the authentication key sharing unit 301 of the second QKD client device 300 may share the second authentication key $Ak_B$ with the QKD center 100, and may share the inter-client authentication key $Ak_{AB}$ with the first QKD client device 200.

The quantum key generation unit 210 may generate a sifted key, corresponding to the QKD center 100, using a quantum state.

Here, the quantum key generation unit 210 may include a quantum state reception unit 211, a random number generator 212, a classical bit transceiver 213, and a logic control unit 214.

Here the components of the quantum key generation unit 210 may correspond to the components of the quantum key generation unit 310 of the second QKD client device 300.

The quantum state reception unit 211 prepares the measurement basis using the random number generator 212, and may receive a quantum state via the quantum channel 51 and measure it. Here, the quantum state reception unit 211 may receive the quantum state through a quantum key distribution protocol such as BB84, B92, or the like.

The random number generator 212 may generate a random signal using quantum mechanics. Here, the random number generator 212 may randomly select a measurement basis (polarization basis). This selections determine the measurement basis of the quantum state reception unit 211.

The classical bit transceiver 213 receives the quantum state preparation basis, which is selected by the random number generator 112 of the QKD center 100, and may transmit the measurement basis for the quantum state, prepared by the random number generator 212.

Here, the logic control unit 214 checks the security of the quantum channel 51 by sharing the information about polarizing plates (preparation bases and measurement bases) with the QKD center 100 via the classical channel 52, and may then transmit the information that remains after checking the security of the quantum channel to the error correction unit 220. Here, the classical channel 52 may be a public channel, and may be eavesdropped on by anybody. However, in the classical channel 52, it may be impossible to falsify information or add additional information. For example, the classical channel 52 may correspond to the concept of a public board such as a newspaper. Here, the classical bit transceiver 213 may guarantee the integrity of information using Message Authentication Code (MAC).

Here, the logic control unit 214 may store information in order to compare the measurement basis for a quantum state, which is randomly selected by the random number generator 212, with the preparation basis for a quantum state, which is randomly selected by the random number generator unit 112 of the QKD center 100.

Here, the logic control unit 214 compares the preparation basis for the quantum state with the measurement basis for the quantum state through communication between the classical bit transceiver 213 and the classical bit transceiver 113, and may check whether a channel is secure using some bits of the bit string on the same basis.

Here, the logic control unit 214 may output a sifted key based on the bits remaining alter checking the security of the channel.

The above-mentioned process of generating the sifted key, performed by the quantum key generation unit 210, may correspond to the process of generating the sifted key, performed by the quantum key generation unit 310 of the second QKD client device 300.

The error correction unit 220 may generate a first output bit string $Rk_A$ by correcting the error of the sifted key corresponding to the QKD center 100. Here, the error correction unit 220 may correct the error of the silted key using Hamming code, Winnow algorithm, LDPC or the like. Specifically, the error correction unit 220 divides the bit string to be transmitted into multiple blocks, and may transmit the parity bit of each of the blocks to the error correction unit 120 of the QKD center 100 via the classical channel 53. The error correction unit 120 of the QKD center 100 may detect a block containing a data error by checking the parity bit of the block. Then, the error correction unit 220 subdivides the block containing the data error, which is detected and announced by the error correction unit 120 of the QKD center 100, and the parity of the subdivided block is repeatedly checked by the error correction unit 120 of the QKD center 100. Through the repetition of this process, when the length of the block containing the parity error becomes the length to which Hamming code can be applied, the error correction unit 220 may determine and correct the bit containing the error by applying Hamming code thereto. Here, the bit string generated by this error-correction process may correspond to a common output bit string between the error correction unit 120 of the QKD center 100 and the error correction unit 220 of the first QKD client device 200. Another bit string generated by this error-correction process may correspond to a common output bit string between the error correction unit 120 of the QKD center 100 and the error correction unit 320 of the second QKD client device 300.

The above-mentioned process of collecting the error performed by the error correction unit 220, may correspond to the process in which the error correction unit 320 of the second QKD client device 300 corrects the error of the sifted key through communication with the error correction unit 120 of the QKD center 100 via the classical channel 63.

Here, the error correction unit 220 may output the first output bit string $Rk_A$ by correcting the error of the sifted key corresponding to the QKD center 100.

Here, the error correction unit 320 of the second QKD client device 300 may output the second output bit string $Rk_B$ by correcting the error of the sifted key corresponding to the QKD center 100.

Here, the error correction unit 120 or the QKD center 100 may output the first distribution output bit string $Rk_A'$ by correcting the error of the sifted key corresponding to the first QKD client device 200.

Here, the error correction unit 120 of the QKD center 100 may output the second distribution output bit string $Rk_B'$ by correcting the error of the sifted key corresponding to the second QKD client device 300.

The bit string calculation unit 230 may calculate a bit string by performing a cryptographic operation on the first output bit siring $Rk_A$, in which an error is corrected, and the first authentication key $Ak_A$, shared between the QKD center 100 and the first QKD client device 200.

The bit string calculation unit 230 may authenticate the QKD center to the first QKD client device by comparing a result of a cryptographic operation performed on a first authentication key, which is shared with the first QKD client device, and a first distribution output bit siring with a result of a cryptographic operation performed on the first authentication key and a first output bit string, the first authentication key being included in the authentication keys, the first distribution output bit string being included in the distribution output bit strings, and the first output bit string being included in the output bit strings.

The bit siring calculation unit 230 may authenticate the QKD center to the second QKD client device by comparing a result of a cryptographic operation performed on a second authentication key, which is shared with the second QKD client device, and a second distribution output bit string with a result of a cryptographic operation performed on the second authentication key and a second output bit string, the second authentication key being included in the authentication keys, the second distribution output bit string being included in the distribution output bit strings, and the second output bit string being included in the output bit strings.

Here, the bit string calculation unit 230 requests the QKD center 100 to authenticate own identity, and the QKD center 100 may open a communication channel in response to the request by the user. Here, authentication of QKD center may be performed using the authentication key, the output bit strings, the distribution output bit strings, and a keyed hash function.

The bit string calculation unit 230 may include a memory unit 231 and an operation unit 232.

The bit string operation unit 130 may include a memory unit 131 and 132, and a operation unit 135.

The memory unit 131 may store the first distribution output bit string $Rk_A'$, which is received from the error correction unit 120. Here, the memory unit 131 may transmit a bit string, acquired by performing an operation on the first authentication key $Ak_A$ and the first distribution output bit string $Rk_A'$, to the memory unit 231 of the QKD client 200 via the classical channel 54.

Here, the operation unit 232 may authenticate the QKD center 100 by comparing the result of a cryptographic operation performed on the first authentication key $Ak_A$ and the first output bit string $Rk_A$ with the result of a cryptographic operation performed on the first authentication key $Ak_A$ and the first distribution output bit string $Rk_A'$ using Equation (1):

$$h_{AkA}(Rk_A)=h_{AkA}(Rk_A') \qquad (1)$$

Meanwhile, the bit string calculation unit 330 of the second QKD client device 300, which requests communication, may include a memory unit 331 and an operation unit 332.

The memory unit 132 may store the second distribution output bit string $Rk_B'$, which is received from the error correction unit 120. Here, the memory unit 132 may transmit a bit string, acquired by performing an operation on the second authentication key $Ak_B$ and the second distribution output bit string $Rk_B'$, to the memory unit 331 of the QKD client 300 via the classical channel 64.

Here, the operation unit 332 may authenticate the QKD center 100 by comparing the result of a cryptographic operation performed on the second authentication key $Ak_B$ and the second output bit string $Rk_B$ with the result of a cryptographic operation, performed on the second authentication key $Ak_B$ and the second distribution output bit string $Rk_B'$ using Equation (2):

$$h_{AkB}(Rk_B)=h_{AkB}(Rk_B') \qquad (2)$$

Here, the bit string operation unit 130 of the QKD center 100 may generate an encryption bit string in such a way that the operation unit 135 performs a cryptographic operation on the second authentication key $Ak_B$, the first distribution output bit string $Rk_A'$ and the second distribution output bit string $Rk_B'$ using Equation (3) only when authentication of the QKD center 100 succeeds.

$$(Rk_A' \oplus Rk_B') \| h_{AkB}(Rk_A' \oplus Rk_B') \qquad (3)$$

where $\oplus$ may correspond to an XOR operation, $\|$ may correspond to a concatenation and $h_{AkB}$ may correspond to a keyed hash function using the second authentication key $Ak_B$.

The operation unit 135 of the bit string operation unit 130 may calculate the encryption bit siring by performing an XOR operation on the first distribution output bit string $Rk_A'$ and the second distribution output bit string $Rk_B'$, and keyed hash function using the second authentication key $Ak_B$.

Here, the operation unit 135 may transmit the encryption bit string to the QKD client device that requests communication.

Here, the operation unit 135 may transmit the encryption bit string to the operation unit 332 of the second QKD client device 300 via the classical channel 65.

Here, the operation unit 332 of the second QKD client device 300 may perform a keyed hash the front of the encryption bit string, ($Rk_A' \oplus Rk_B'$). If the outcome is same with the back end of the encryption bit string, $h_{AkB}$ ($Rk_A' \oplus Rk_B'$), the operation unit 332 may perform an XOR operation on the front of the encryption bit string, received from the operation unit 135, and the second output bit string $Rk_B$, received from the memory unit 331, using Equation (4):

$$(Rk_A' \oplus Rk_B') \oplus Rk_B (\oplus Rk_A') \qquad (4)$$

Here, if authentication between the second QKD client device 300 and the QKD center 100 succeeds, because the second distribution output bit siring $Rk_B'$ corresponds to the second output bit string $Rk_B$, the operation unit 332 may calculate the first distribution output bit string $Rk_A'$ using the result of the XOR operation of Equation (4).

Here, the operation unit 332 may calculate a shared key bit string by performing an XOR operation on the calculated first distribution output bit string $Rk_A'$ and the inter-client authentication key $Ak_{AB}$, shared with the first QKD client device 200, which is requested to communicate, using Equation (5):

$$Rk_A' \oplus Ak_{AB} \qquad (5)$$

That is, the combination of Equations (3) to (5) may correspond to Equation (6):

$$(\text{INPUT}_{65}) \oplus Rk_B \oplus Ak_{AB} = Rk_A' \oplus Ak_{AB} \qquad (6)$$

Here, $\text{INPUT}_{65}$ may correspond to the front of the encryption bit string, which is received from the operation unit 135 of the QKD center 100 via the classical channel 65.

Here, if authentication between the first QKD client deice 200, which was requested to communicate, and the QKD center 100 succeeds, the operation unit 232 may calculate a shared key bit string by performing a cryptographic operation on the first output bit string $Rk_A$ and the inter-client authentication key $Ak_{AB}$, shared with the second QKD client device 300, which requested the communication, using Equation (7):

$$Rk_A \oplus Ak_{AB} \qquad (7)$$

If authentication between the first QKD client device 200, which was requested to communicate, and the QKD center 100 succeeds, the first distribution output bit string $Rk_A'$ of Equation (4) may correspond to the first output bit string $Rk_A$ according to Equation (1).

Accordingly, because the shared key bit string ($Rk_A \oplus Ak_{AB}$), calculated using Equation (7) by the operation unit 232 of the first QKD client device 200, corresponds to the shared key bit siring ($Rk_A' \oplus Ak_{AB}$), calculated using Equation (5) by the operation unit 332 of the second QKD client device 300, the same encryption key may be shared therebetween.

The privacy amplification unit 240 may generate a final key bit string by applying a hash function, which is shared with the second QKD client 300, to the shared key bit string. Here, the privacy amplification unit 240 may delete some of the information about the key, leaked to an eavesdropper in the process of error correction and modification.

In other words, the privacy amplification unit 240 may calculate the final key-bit string using Equation (8):

$$K_{AB}=h(Rk_A \oplus Ak_{AB}) \qquad (8)$$

Here, h may be a hash function that the privacy amplification unit 240 uses in order to delete the information exposed to the eavesdropper. The hash function may be shared among the QKD client devices in advance.

The privacy amplification unit 340 of the second QKD client device 300, which requested the communication, may calculate the final key hit string using Equation (9):

$$K_{AB} = h(Rk_A' \oplus Ak_{AB}) \tag{9}$$

Here, h may be the hash function that the privacy amplification unit 340 uses in order to delete the information exposed to the eavesdropper. The hash function may be shared among the QKD client devices in advance.

Here, the length of the bit siring may be reduced through the process in which the privacy amplification unit 240 or 340 deletes the information exposed to the eavesdropper by applying the hash function to the shared key bit string. Accordingly, if the hash function h is suitably selected, information about the final key bit string $K_{AB}$ may be protected from eavesdroppers.

Figure 5:
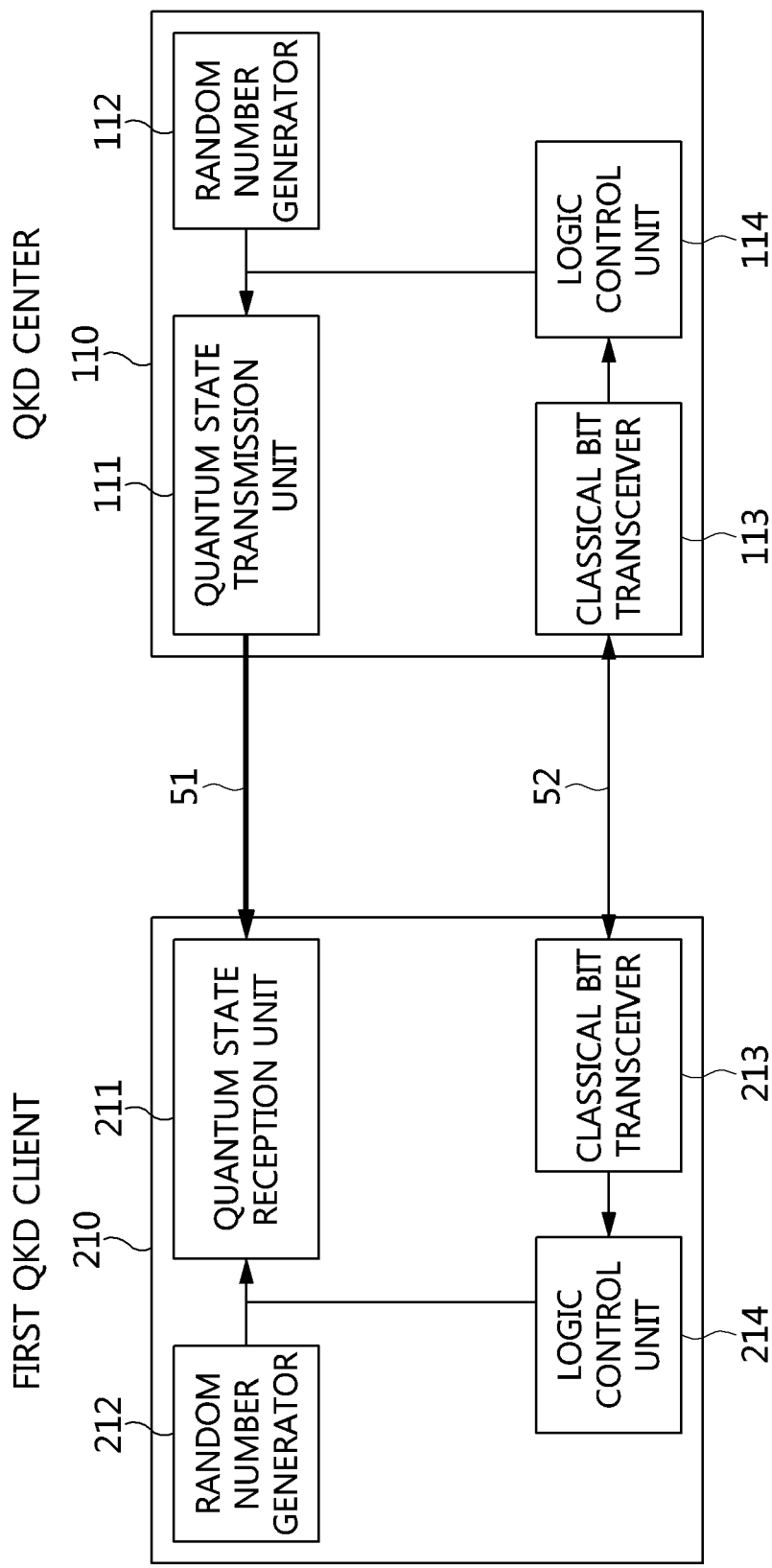
FIG. 5 is a block diagram specifically illustrating an example of the quantum key generation unit of the QKD center and an example of the quantum key generation unit of the first QKD client device, illustrated in FIG. 4.

FIG. 5 is a block diagram specifically illustrating an example of the quantum key generation unit of the QKD center and an example of the quantum key generation unit of the first QKD client device, illustrated in FIG. 4.

Referring to FIG. 5, the quantum key generation unit 210 of the first QKD client device 200 according to an embodiment of the present invention includes a quantum state reception unit 211, a random number generator 212, a classical bit transceiver 213, and a logic control unit 214.

Here, the components of the quantum key generation unit 210 may correspond to the components of the quantum key generation unit 310 of the second QKD client device 300.

The quantum key generation unit 210 may generate a sifted key, corresponding to the QKD center 100, using a quantum state.

The quantum state reception unit 211 prepares the measurement basis using the random number generator 212, and may receive a quantum state via the quantum channel 51 and measure it. Here, the quantum state reception unit 211 may receive the quantum state through a quantum key distribution protocol such as BB84, B92, or the like.

The random number generator 212 may generate a random signal using quantum mechanics. Here, the random number generator 212 may randomly select a measurement basis (polarization basis).

The classical bit transceiver 213 receives the quantum state preparation basis, which is selected by the random number generator 112 of the QKD center 100, and may transmit the measurement basis for the quantum state, prepared by the random number generator 212.

Here, the logic control unit 214 checks the security of the quantum channel 51 by sharing the information about polarizing plates (preparation bases and measurement bases) with the QKD center 100 via the classical channel 52, and may then transmit the information that remains after checking the security of the quantum channel to the error correction unit 220. Here, the classical channel 52 may be a public channel, and may be eavesdropped on by anybody. However, in the classical channel 52, falsification, and the addition of additional information may not be allowed. For example, the classical channel 52 may correspond to the concept of a public board such as a newspaper. Here, the classical bit transceiver 213 may guarantee the integrity of information using Message Authentication Code (MAC).

Here, the logic control unit 214 may store information in order to compare the measurement basis for a quantum state, which is randomly selected by the random number generator 212, with the preparation basis for a quantum state, which is randomly selected by the random number generator unit 112 of the QKD center 100.

Here, the logic control unit 214 compares the preparation basis for the quantum state with the measurement basis for the quantum state through communication between the classical bit transceiver 213 and the classical bit transceiver 113, and may check whether a channel is secure using some bits of the bit string on the same basis.

Here, the logic control unit 214 may output a sifted key based on the bits remaining after checking the security of the channel.

The above-mentioned process of generating the sifted key, performed by the quantum key generation unit 210, may correspond to the process of generating the sifted key, performed by the quantum key generation unit 310 of the second QKD client device 300.

Meanwhile, the quantum key generation unit 110 of the QKD center 100 may generate sifted keys, corresponding to the QKD client devices, using quantum states.

Here, the quantum key generation unit 110 may include a quantum state transmission unit 111, a random number generator 112, a classical bit transceiver 113, and a logic control unit 114.

The quantum state transmission unit 111 may prepare a quantum state and transmit it via the quantum channel 51. Here, the quantum state transmission unit 111 may transmit the quantum state through a quantum key distribution protocol such as BB84, B92, or the like.

The random number generator 112 may generate a random signal using quantum mechanics. Here, the random number generator 112 may randomly select a preparation basis (polarization basis) and quantum states.

The classical bit transceiver 113 may receive the quantum state selected by the random number generator 212 of the first QKD client device 200, and may transmit the preparation basis for the quantum state, selected by the random number generator 112.

Here, the logic control unit 114 checks the security of the quantum channel 51 by sharing the information about polarizing plates (preparation bases and measurement bases) with the first QKD client device 200 via the classical channel 52, and may then transmit the information that remains after checking the security of the quantum channel to the error correction unit 120. Here, the classical channel 52 may be a public channel, and may be eavesdropped on by anybody. However, in the classical channel 52, falsification and the addition of additional information may not be allowed. For example, the classical channel 52 may correspond to the concept of a public board such as a newspaper. Here, the classical bit transceiver 113 may guarantee the integrity of information using Message Authentication Code (MAC).

Here, the logic control unit 114 may store information in order to compare the preparation basis for a quantum state, which is randomly selected by the random number generator 112, with the measurement basis for a quantum state, which is randomly selected by the random number generator 212 of the first QKD client device 200.

Here, the logic control unit 114 compares the preparation basis for the quantum state with the measurement basis for the quantum state through communication between the classical bit transceiver 113 and the classical bit transceiver 213 of the first QKD client device 200, and may check whether a channel is secure using some bits of the bit string on the same basis.

Here, the logic control unit 114 may output a sifted key based on the bits remaining after checking the security of the channel.

The above-mentioned process of generating the sifted key, performed by the quantum key generation unit 110, may correspond not only to the process of generating the sifted key in the first QKD client device 200, but also to the process of generating the sifted key in the second QKD client device 300.

Figure 6:
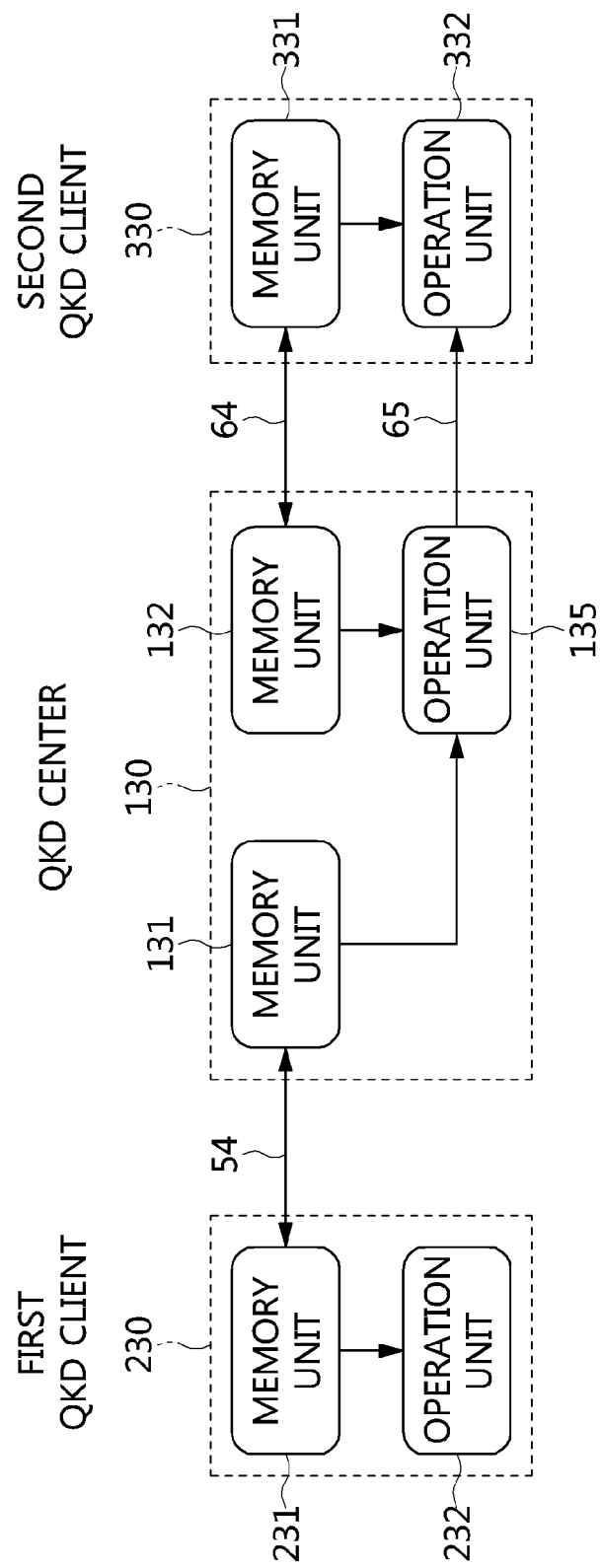
FIG. 6 is a block diagram specifically illustrating an example of the bit string calculation unit and an example of the bit string operation unit, illustrated in FIG. 4.

FIG. 6 is a block diagram specifically illustrating an example of the bit string calculation unit and an example of the bit string operation unit, illustrated in FIG. 4.

Referring to FIG. 6, the bit string calculation unit 230 of the first QKD client device 200 may include a memory unit 231 and an operation unit 232.

The memory unit 131 may store the first distribution output bit string $Rk_A'$, which is received from the error correction unit 120. Here, the memory unit 131 may transmit a bit siring, acquired by performing an operation on the first authentication key $Ak_A$ and the first distribution output bit string $Rk_A'$, to the memory unit 231 of the QKD client 200 via the classical channel 54.

Here, the operation unit 232 may authenticate the QKD center 100 by comparing the result of a cryptographic operation performed on the first authentication key $Ak_A$ and the first output bit string $Rk_A$ with the result of a cryptographic operation performed on the first authentication key $Ak_A$ and the first distribution output bit string $Rk_A'$ using Equation (1):

$$h_{AkA}(Rk_A) = h_{AkA}(Rk_A') \quad (1)$$

Meanwhile, the bit string calculation unit 330 of the second QKD client device 300, which requested communication, may include a memory unit 331 and an operation unit 332.

The memory unit 132 may store the second distribution output bit string $Rk_B'$, which is received from the error correction unit 120. Here, the memory unit 132 may transmit a bit siring, acquired by performing an operation on the second authentication key $Ak_B$ and the second distribution output bit string $Rk_B'$, to the memory unit 331 of the QKD client 300 via the classical channel 64.

Here, the operation unit 332 may authenticate the QKD center 100 by comparing the result of a cryptographic operation performed on the second authentication key $Ak_B$ and the second output bit string $Rk_B$ with the result of a cryptographic operation performed on the second authentication key $Ak_B$ and the second distribution output bit string $Rk_B'$ using Equation (2):

$$h_{AkB}(Rk_B) = h_{AkB}(Rk_B') \quad (2)$$

Here, the bit siring operation unit 130 of the QKD center 100 may generate an encryption bit string in a such a way that the operation unit 135 performs a cryptographic operation on the second authentication key $Ak_B$, the first distribution output bit string $Rk_A'$ and the second distribution output bit string $Rk_B'$ using Equation (3) only when authentication of the QKD center 100 succeeds.

$$(Rk_A' \oplus Rk_B') \| h_{AkB}(Rk_A' \oplus Rk_B') \quad (3)$$

where $\oplus$ may correspond to an XOR operation, $\|$ may correspond to a concatenation and $h_{AkB}$ may correspond to a keyed hash function using the second authentication key $Ak_B$.

The operation unit 135 of the bit string operation unit 130 may calculate the encryption bit string by performing an XOR operation on the first distribution, output bit string $Rk_A'$ and the second distribution output bit string $Rk_B'$ and performing keyed hash function using the second authentication key $Ak_B$.

Here, the operation unit 135 may transmit the encryption bit string to the QKD client device that requested communication.

Here, the operation unit 135 may transmit the encryption bit string to the operation unit 332 of the second QKD client device 300 via the classical channel 65.

Here, the operation unit 332 of the second QKD client device 300 may perform a keyed hash on the front of the encryption bit string, $(Rk_A' \oplus Rk_B')$. If the outcome is same with the back end of the encryption bit string, $h_{AkB}(Rk_A' \oplus Rk_B')$, the operation unit 332 may perform an XOR operation on the front of the encryption bit string, received from the operation unit 135, and the second output bit string $Rk_B$, received from the memory unit 331 using Equation (4):

$$(Rk_A' \oplus Rk_B') \oplus Rk_B = Rk_A' \quad (4)$$

Here, if authentication between the second QKD client device 300 and the QKD center 100 succeeds, because the second distribution output bit string $Rk_B'$ corresponds to the second output bit string $Rk_B$, the operation unit 332 may calculate the first distribution output bit string $Rk_A'$ using the result of the XOR operation of Equation (4).

Here, the operation unit 332 may calculate a shared key bit string by performing an XOR operation on the calculated first distribution output bit string $Rk_A'$ and the inter-client authentication key $Ak_{AB}$, shared with the first QKD client device 200, which was requested to communicate, using Equation (5):

$$Rk_A' \oplus Ak_{AB} \quad (5)$$

That is, the combination of Equations (3) to (5) may correspond to Equation (6):

$$(INPUT_{65}) \oplus Rk_B \oplus Ak_{AB} = Rk_A' \oplus Ak_{AB} \quad (6)$$

Here, $INPUT_{65}$ may correspond to the front of the encryption bit string, which is received from the operation unit 135 of the QKD center 100 via the classical channel 65.

Here, if authentication between the first QKD client device 200, which was requested to communicate, and the QKD center 100 succeeds, the operation unit 232 may calculate a shared key bit string by performing a cryptographic operation on the first output bit string $Rk_A$ and the inter-client authentication key $Ak_{AB}$, shared with the second QKD client device 300, which requested the communication, using Equation (7):

$$Rk_A \oplus Ak_{AB} \quad (7)$$

If authentication between the first QKD client device 200, which was requested to communicate, and the QKD center 100 succeeds, the first distribution output bit string $Rk_A'$ of Equation (4) may correspond to the first output bit string $Rk_A$ according to Equation (1).

Accordingly, because the shared key bit string $(Rk_A \oplus Ak_{AB})$, calculated using Equation (7) by the operation unit 232 of the first QKD client device 200, corresponds to the shared key bit string $(Rk_A' \oplus Ak_{AB})$, calculated using Equation (5) by the operation unit 332 of the second QKD client device 300, the same encryption key may be shared therebetween.

Figure 7:
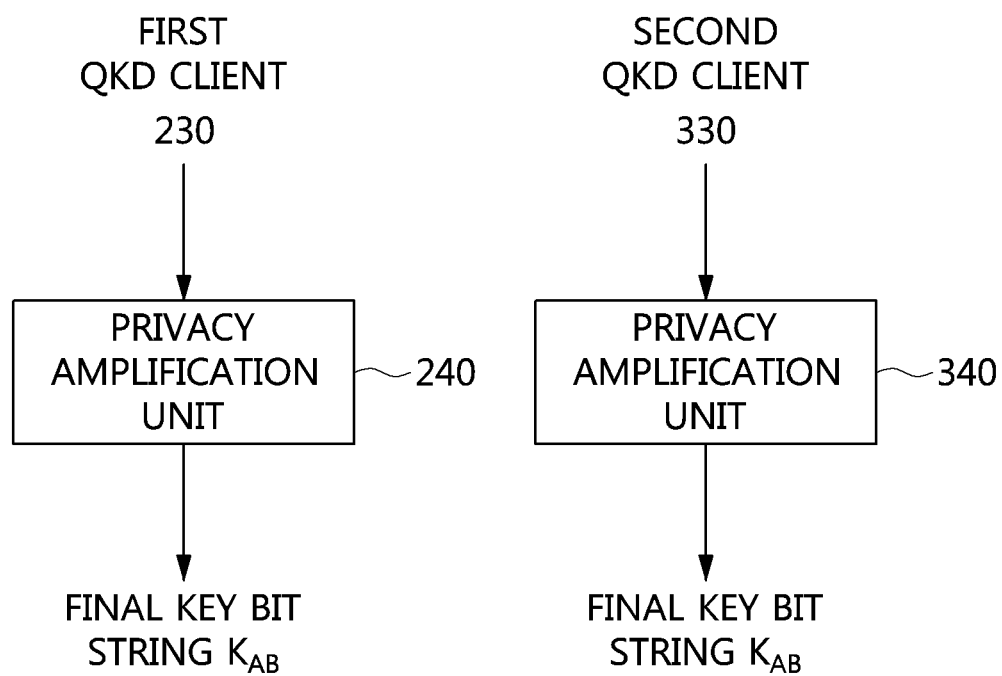
FIG. 7 is a block diagram specifically illustrating an example of the privacy amplification unit illustrated in FIG. 4.

FIG. 7 is a block diagram specifically illustrating an example of the privacy amplification unit illustrated in FIG. 4.

Referring to FIG. 7, the privacy amplification unit 240 or 340 may generate a final key bit string by applying a hash function to the shared key bit string. Here, the privacy amplification unit 240 or 340 may delete some of the information about the key, which was leaked to an eavesdropper in the process of error correction and modification.

In other words, the privacy amplification unit 240 of the first QKD client device 200, which was requested to communicate, may calculate the final key bit string using Equation (8):

$$K_{AB}=h(Rk_A \oplus Ak_{AB}) \quad (8)$$

Here, h may be a hash function that the privacy amplification unit 240 uses in order to delete the information exposed to the eavesdropper. The hash function may be shared among the QKD client devices in advance.

The privacy amplification unit 340 of the second QKD client device 300, which requested the communication, may calculate the final key bit string using Equation (9):

$$K_{AB}=h(Rk_A \oplus Ak_{AB}) \quad (9)$$

Here, h may be the hash function that the privacy amplification unit 340 uses in order to delete the information exposed to the eavesdropper. The hash function may be shared among the QKD client devices in advance.

Here, the length of the bit string may be reduced through the process in which the privacy amplification unit 240 or 340 deletes the information exposed the eavesdropper by applying the hash function to the shared key bit string. Accordingly, if the hash function h is suitably selected, information about the final key bit string $K_{AB}$ may be protected from eavesdroppers.

Figure 8:
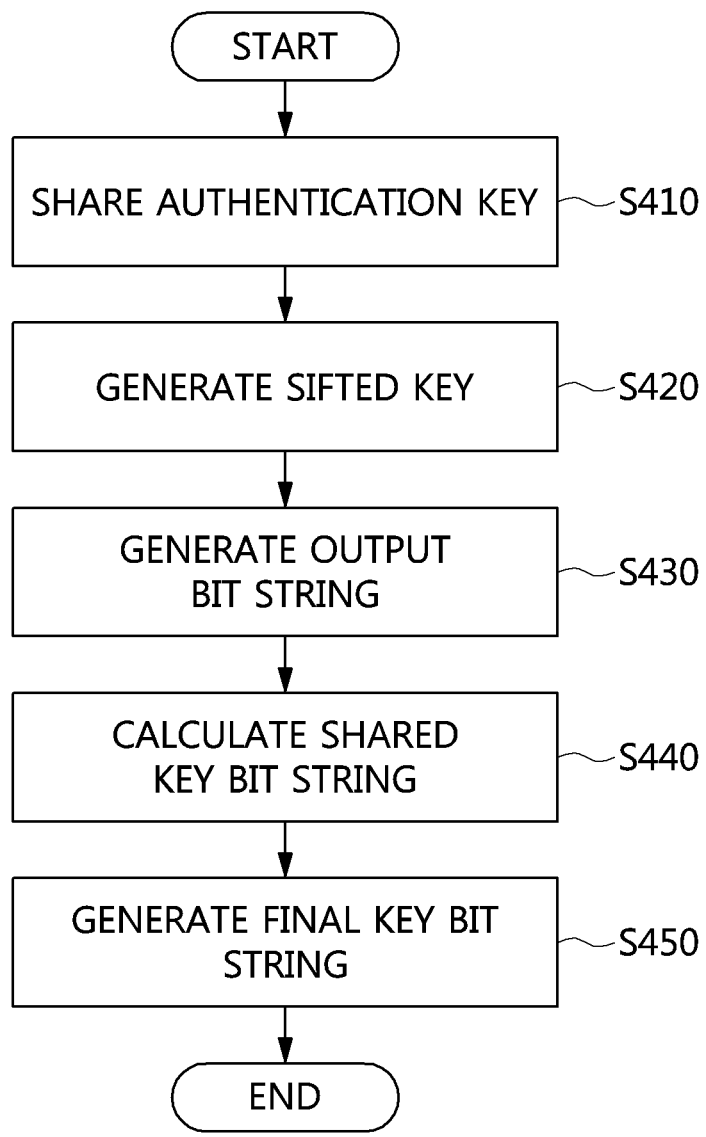
FIG. 8 is a flowchart illustrating a QKD method according to an embodiment of the present invention.

FIG. 8 is a flowchart illustrating a quantum key distribution method according to an embodiment of the present invention.

Referring to FIG. 8, in the quantum key distribution method according to an embodiment of the present invention, authentication keys and a hash function are shared at step S410.

At step S410, the QKD center 100 and the QKD client devices may share authentication keys and a hash function therebetween.

Specifically, at step S420, the QKD center 100 and the first QKD client device 200 may share a first authentication key $Ak_A$ therebetween, the QKD center 100 and the second QKD client device 300 may share a second authentication key $Ak_B$ therebetween, and the first QKD client deuce 200 and the second QKD client device 300 may share an inter-client authentication key $Ak_{AB}$ and a hash function h therebetween.

Also, in the quantum key distribution method according to an embodiment of the present invention, sifted keys may be generated at step S420.

Specifically describing step S420, first, a quantum state may be transmitted and received at step S421.

Here, the quantum state may be transmitted and received through a quantum key distribution protocol such as BB84, B92, or the like at step S421. Here, the quantum state is prepared, and may be transmitted and received via a quantum channel 51 or 61 at step S421.

Also, the selected preparation basis may be compared with the measurement basis at step S422.

Here, at step S422, a random signal may be generated using quantum mechanics.

Here, at step S422, the selected measurement basis and preparation basis for a quantum state may be transmitted and received via a classical channel 52 or 62.

Also, the security of a channel may be checked on the same basis at step S423.

In other words, at step S423, the security of a quantum channel 51 or 61 is checked by comparing information about polarizing plates (preparation bases and measurement bases) through the classical channel 52 or 62, and the information remaining after checking the security of the quantum channel 51 or 61 may be used at step S430. Here, the classical channel 52 or 62 may correspond to a public channel, and may be eavesdropped on by anybody. However, in the classical channel 52 or 62, it may be impossible to falsify information or to add additional information. For example, the classical channel 52 or 62 may correspond to the concept of a public board such as a newspaper. Here, at step S423, the integrity of information may be guaranteed using Message Authentication Code (MAC).

At step S423, information may be stored in order to compare the randomly selected preparation basis for a quantum state with the randomly selected measurement basis for the quantum state.

Here, at step S423, the preparation basis for a quantum state is compared with the measurement basis for the quantum state through the classical channel 52 or 62, and the security of a channel may be checked using some bits of the bit string, acquired on the same basis.

Also, sifted keys may be generated at step S424.

Here, at step S424, the sifted keys may be output based on the bits remaining after checking the security of the channel.

Here, at step S424, sifted keys corresponding to the QKD center 100 and QKD client devices may be generated.

Here, at step S424, sifted keys corresponding to the QKD center 100 and the first QKD client device 200 may be generated, and sifted keys corresponding to the QKD center 100 and the second QKD client device 300 may be generated.

Also, in the quantum key distribution method according to an embodiment of the present invention, output bit strings may be generated at step S430.

Specifically describing step S430, first, the error of a sifted key may be corrected at step S431.

Here, output bit strings may be generated by correcting the errors of the sifted keys at step S431. Here, the error may be corrected using Hamming code, Winnow algorithm, LDPC or the like. Here, the bit string to be transmitted is divided into multiple blocks, and the parity bit of each of the blocks may be transmitted and received via the classical channel 53 or 63. At step S431, a block containing a data error may be detected by checking the parity bit of the block. Then, the block, containing the data error, is subdivided, and the parity bit thereof is repeatedly checked. Through such a repetition, when the length of the block containing the parity error becomes a length to which Hamming code can be applied, Hamming code is applied thereto, whereby the bit containing the error may be determined and corrected at step S431.

Also, at step S430, distribution output bit strings of the QKD center 100 may be generated at step S432.

Here, at step S432 the first distribution output bit string $Rk_A'$ may be generated in such a way that the QKD center 100 corrects the error of the sifted key corresponding to the first QKD client device 200.

Here, at step S432, the second distribution output bit string $Rk_B'$ may be generated in such a way that the QKD center 100 corrects the error of the sifted key corresponding to the second QKD client device 300.

Also, at step S430, the output bit strings of the QKD client devices may be generated at step S433.

Here, at step S433, the first output bit string $Rk_A$ may be generated in such a way that the first QKD client device 200 corrects the error of the sifted key corresponding to the QKD center 100.

Here, at step S433, the second output bit string $Rk_B$ may be generated in such a way that the second QKD client device 300 corrects the error of the sifted key corresponding to the QKD center 100.

Here, the order in which step S432 and step S433 may be performed at the same time.

The bit string, generated through the error-correction process, may correspond to a common output bit string between the QKD center 100 and the QKD client devices.

Also, at step S430, the QKD center 100 may be authenticated at step S434.

Here, at step S434, the QKD center 100 may authenticate own identify according to a request of one QKD client and open a communication channel in response to the requests by the QKD client devices. Here, authentication may be performed using the authentication key shared with the QKD client devices, the output bit strings, the distribution output bit strings, and a keyed hash function.

Here, at step S434, a bit string, acquired by performing an operation on the first authentication key $Ak_A$ and the first distribution output bit string $Rk_A'$ may be transmitted from the QKD center 100 to the first QKD client device 200 via the classical channel 54.

Here, at step S434, the QKD client device 200 may authenticate the QKD center 100 by comparing the result of a cryptographic operation performed on the first authentication key $Ak_A$ and the first distribution output bit string $Rk_A'$ with the result of a cryptographic operation performed on the first authentication key $Ak_A$ and the first output bit string $Rk_A$ using Equation (1):

$$h_{AkA}(Rk_A)=h_{AkA}(Rk_A') \tag{1}$$

Here, at step S134, the result of the operation performed on the second authentication key $Ak_B$ and the second distribution output bit string $Rk_B'$ may be transmitted from the QKD center 100 to the second QKD client device 300 via the classical channel 64.

Here, at step S434, the QKD client device 300 may authenticate the QKD center 100 by comparing the result of a cryptographic operation performed on the second authentication key $Ak_B$ and the second distribution output bit string $Rk_B'$ with the result of a cryptographic operation performed on the second authentication key $Ak_B$ and the second output bit string $Rk_B$ using Equation (2):

$$h_{AkB}(Rk_B)=h_{AkB}(Rk_B') \tag{2}$$

Here, at step S434, the QKD center 100 may authenticate own identity according to Equation (1) and Equation (2).

Also, in the quantum key distribution method according to an embodiment of the present invention, a shared key bit string may be calculated at step S440.

Specifically describing step S440, first, an encryption bit string may be calculated at step S441.

Here, at step S441, only when authentication of the QKD center 100 has succeeded, the encryption bit string may be generated by performing a cryptographic operation on the second authentication key $Ak_B$, the first distribution output bit string $Rk_A'$ and the second distribution output bit string $Rk_B'$ using Equation (3):

$$(Rk_A'\oplus Rk_B')\|h_{AkB}(Rk_A'\oplus Rk_B') \tag{3}$$

where $\oplus$ may correspond to an XOR operation, $\|$ may correspond to a concatenation and $h_{AkB}$ may correspond to a keyed hash function using the second authentication key $Ak_B$.

Here, at step S441, the encryption bit string may be calculated by performing an XOR operation on the first distribution output bit siring $Rk_A'$ and the second distribution output bit string $Rk_B'$, and performing keyed hash function using the second authentication key $Ak_B$.

Also, a shared key bit string of the QKD client device that requested communication may be calculated at step S442.

Here, at step S442, the encryption bit string may be transmitted to the QKD client device that requested communication.

Here, at step S442, the encryption bit string may be transmitted to the second QKD client device 300, which requested the communication, via the classical channel 65.

Here, at step S442, an XOR operation may be performed on the front of the encryption bit string and the second output bit string $Rk_B$ in the second QKD client device 300 using Equation (4):

$$(Rk_A'\oplus Rk_B')\oplus Rk_B'\oplus Rk_A') \tag{4}$$

Here, if authentication between the second QKD client device 300 and the QKD center 100 succeeds, because the second distribution output bit siring $Rk_B'$ corresponds to the second output bit string $Rk_B$, the first distribution output bit string $Rk_A'$ may be calculated from the XOR operation of Equation (4) at step S442.

Here, at step S442, a shared key bit string may be calculated by performing an XOR operation on the calculated first distribution output bit string $Rk_A'$ and the inter-client authentication key $Ak_{AB}$, shared between the first QKD client device 200 which is requested to communicate, and the second QKD client deice 300, which requests communication, using Equation (5):

$$Rk_A'\oplus Ak_{AB} \tag{5}$$

That is, the combination of Equations (3) to (5) may correspond to Equation (6):

$$(INPUT_{65})\oplus Rk_B\oplus Ak_{AB}=Rk_A'\oplus Ak_{AB} \tag{6}$$

Here, $INPUT_{65}$ may correspond to the front of the encryption bit string, which is received from the operation unit 135 of the QKD center 100 via the classical channel 65.

Also, a shared key bit string of the QKD client device, which was requested to communicate, may be calculated at step S443.

Here, at step S443, if authentication between the first QKD client device 200, which was requested to communicate, and the QKD center 100 succeeds, a shared key bit string may be calculated by performing an XOR operation on the first output bit string $Rk_A$ and the inter-client authentication key $Ak_{AB}$, shared with the second QKD client device 300, which requested the communication, using Equation (7):

$$Rk_A\oplus Ak_{AB} \tag{7}$$

If authentication between the first QKD client device 200, which was requested to communicate, and the QKD center 100 succeeds, the first distribution output bit string $Rk_A'$ of Equation (4) may correspond to the first output bit string $Rk_A$ according to Equation (1).

Accordingly, because the shared key bit string ($Rk_A\oplus Ak_{AB}$), calculated by the operation unit 232 of the first QKD client device 200 according to Equation (7), corresponds to the shared key bit string ($Rk_A'\oplus Ak_{AB}$), calculated by the operation unit 332 of the second QKD client device 300 according to Equation (5), the same encryption key may be shared therebetween.

Also, in the quantum key distribution method according to an embodiment of the present invention, a final key bit string may be generated at step S450.

Here, at step S450, the final key bit string may be generated by applying a hash function to the shared key bit string. Here, at step S450, some information about the key, leaked to an eavesdropper in the process of error correction and modification, may be deleted.

Here, at step S450, the final key bit string may be calculated using Equation (8) in the first QKD client device 200, which is requested to communicate.

$$K_{AB} = h(Rk_A \oplus Ak_{AB}) \qquad (8)$$

where h may be a hash function that is used to delete the information exposed to the eavesdropper.

The hash function may be shared among the QKD client devices in advance at step S410.

Here, at step S450, the final key bit string may be calculated using Equation (9) in the second QKD client device 300, which requested the communication.

$$K_{AB} = h(Rk_A' \oplus Ak_{AB}) \qquad (9)$$

where h may be the hash function that is used to delete the information exposed to the eavesdropper.

The hash function may be shared among the QKD client devices in advance at step S410.

Here, at step S450, the length of the bit string may be reduced by deleting the information exposed to the eavesdropper by applying the hash function to the shared key bit string. Therefore, if the hash function h is suitably selected, information about the final key bit string $K_{AB}$ may be protected from eavesdroppers.

Figure 9:
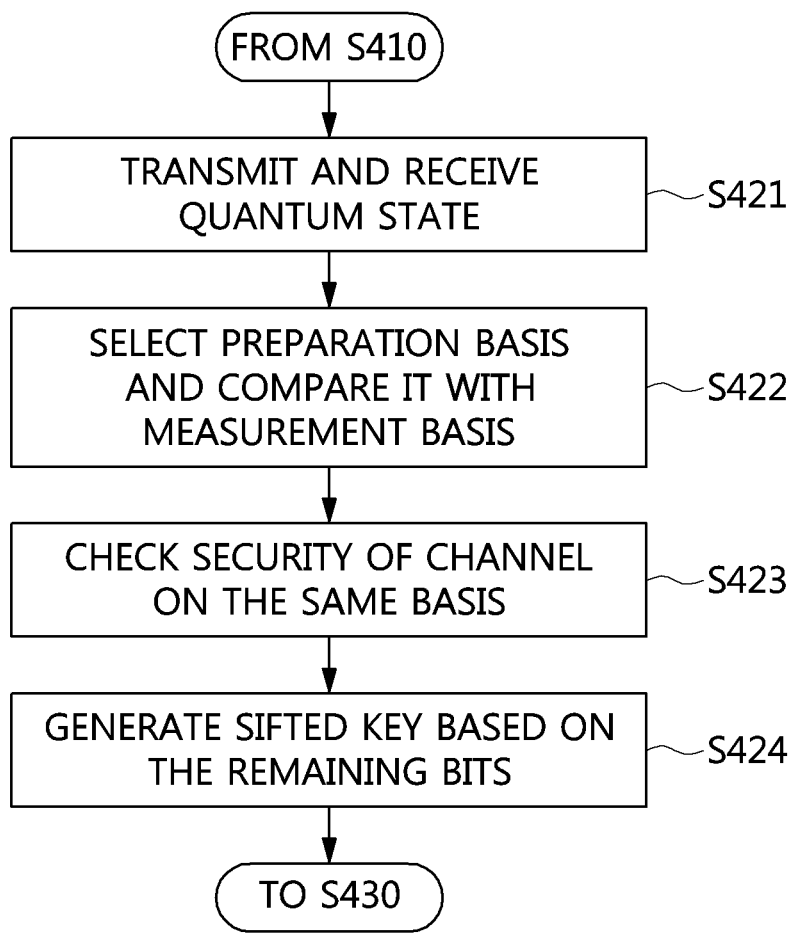
FIG. 9 is a flowchart specifically illustrating an example of the step of generating a sifted key, illustrated in FIG. 8.

FIG. 9 is a flowchart specifically illustrating an example of the step of generating a sifted key, illustrated in FIG. 8.

Referring to FIG. 9, at step S420, first, a quantum state may be transmitted and received at step S421.

Here, the quantum state may be transmitted and received through a quantum key distribution protocol such, as BB84, B92, or the like at step S421. Here, the quantum state is prepared, and may be transmitted and received via a quantum channel 51 or 61 at step S421.

Also, the selected preparation basis may be compared with the measurement basis at step S422.

Here, at step S422, a random signal may be generated using quantum mechanics.

Here, at step S422, the selected measurement basis and preparation basis for a quantum state may be transmitted and received via a classical channel 52 or 62.

Also, the security of a channel may be checked based on the same basis at step S423.

Here, at step S423, the security of a quantum channel 51 or 61 is checked by comparing information about polarizing plates (preparation bases and measurement bases) through the classical channel 52 or 62, and the information remaining after checking the security of the quantum channel 51 or 61 may be used at step S430. Here, the classical channel 52 or 62 may correspond to a public channel, and may be eavesdropped on by anybody. However, in the classical channel 52 or 62, it may be impossible to falsify information or to add additional information. For example, the classical channel 52 or 62 may correspond to the concept of a public board such as a newspaper. Here, at step S423, the integrity of information may be guaranteed using Message Authentication Code (MAC).

At step S423, information may be stored in order to compare the randomly selected preparation basis for a quantum state with the randomly selected measurement basis for the quantum state.

Here, at step S423, the preparation basis for a quantum state is compared with the measurement basis for the quantum state through the classical channel 52 or 62, and the security of a channel may be checked using some bits of the bit string, acquired on the same basis.

Also, sifted keys may be generated at step S424.

Here, at step S424, the sifted keys may be output based on the bits remaining after checking the security of the channel.

Here, at step S424, sifted keys corresponding to the QKD center 100 and QKD client devices may be generated.

Here, at step S424, sifted keys corresponding to the QKD center 100 and the first QKD client deice 200 may be generated, and sifted keys corresponding to the QKD center 100 and the second QKD client device 300 may be generated.

Figure 10:
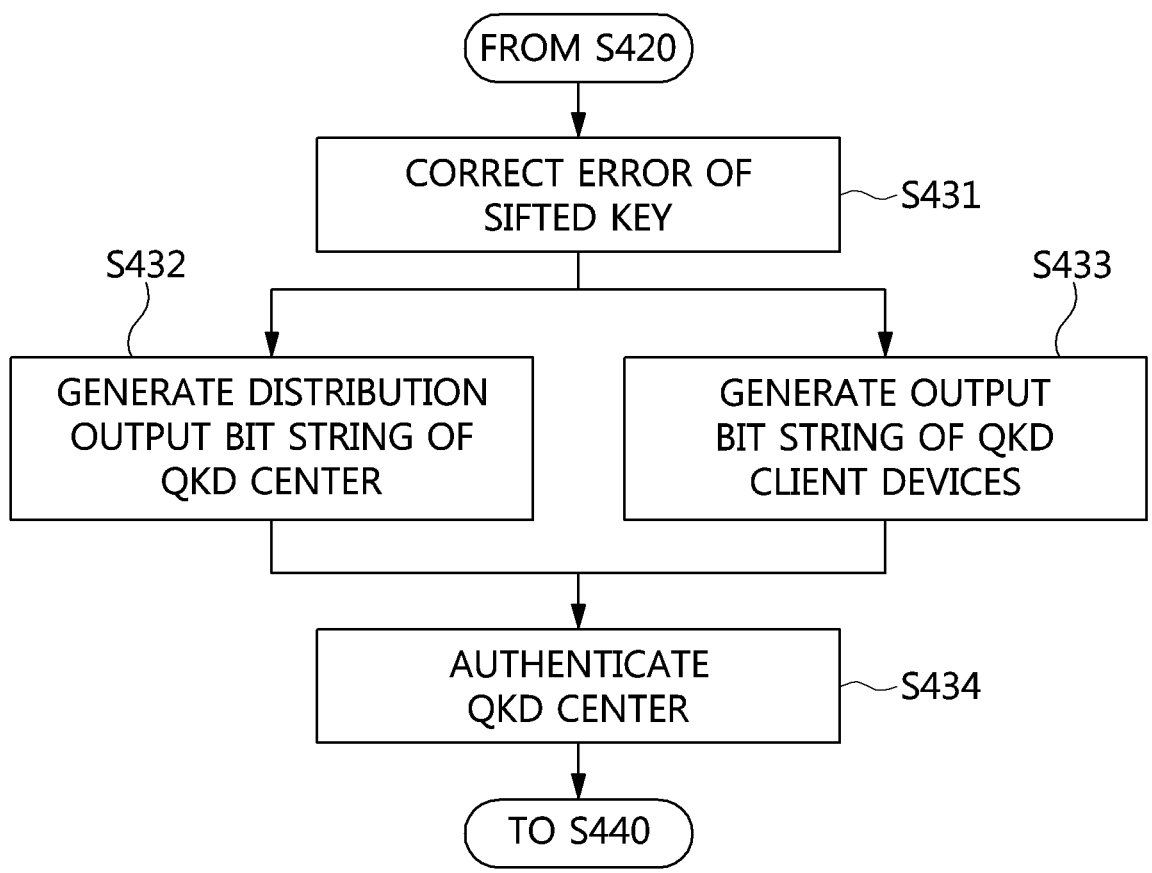
FIG. 10 is a flowchart specifically illustrating an example of the step of generating an output bit string, illustrated in FIG. 8.

FIG. 10 is a flow chart specifically illustrating an example of the step of generating an output bit string, illustrated in FIG. 8.

Referring to FIG. 10, first, the error of a sifted key may be corrected at step S431.

Here, output bit strings may be generated by correcting the error of the sifted keys at step S431. Here, the error may be corrected using Hamming code, Winnow algorithm, LTPC or the like. Here, the bit string to be transmitted is divided into multiple blocks, and the parity bit of each of the blocks may be transmitted and received via the classical channel 53 or 63. At step S431, a block containing a data error may be detected by checking the parity bit of the block. Then, the block, containing the data error, is subdivided, and the parity bit thereof is repeatedly checked. Through such a repetition, when the length of the block containing the parity error becomes a length to which Hamming code can be applied, Hamming code is applied thereto, whereby the bit containing the error may be determined and corrected at step S431.

Also, distribution output bit strings of the QKD center 100 may be generated at step S432.

Here, at step S432, the first distribution output bit string $Rk_A'$, included in the distribution output bit strings, may be generated in such a way that the QKD center 100 corrects the error of the sifted key corresponding to the first QKD client device 200.

Here, at step S432, the second distribution output bit string $Rk_B'$, included in the distribution output bit strings, may be generated in such a way that the QKD center 100 corrects the error of the sifted key corresponding to the second QKD client device 300.

Also, the output bit strings of the QKD client devices may be generated at step S433.

Here, at step S433, the first output bit string $Rk_A$ be generated in such a way, that the first QKD client device 200 corrects the error of the sifted key corresponding to the QKD center 100.

Here, at step S433, the second output bit string $Rk_B$ may be generated in such a way that the second QKD client device 300 corrects the error of the sifted key corresponding to the QKD center 100.

Here, the order in which step S432 and step S433 may be performed at the same time.

The bit siring, generated through the error-correction process, may correspond to a common output bit string between the QKD center 100 and the QKD client devices.

Also, at step S430, the QKD center 100 may be authenticated at step S434.

Here, at step S434, the QKD client devices request authentication of the QKD center 100 to the QKD center 100, and the QKD center 100 may authenticate own identity and open a communication channel in response to the request by the QKD client devices. Here, authentication may be performed using the authentication key shared with the QKD client devices, the output bit strings, the distribution output bit strings, and a keyed hash function.

Here, at step S434, a bit string, acquired by performing an operation on the first authentication key $Ak_A$ and the first output bit string $Rk_A$, may be transmitted from the QKD center 100 to the first QKD client device 200 via the classical channel 54.

Here, at step S434, the QKD center 100 may authenticate own identity by comparing the result of a cryptographic operation performed on the first authentication key $Ak_A$ and the first distribution output bit string $Rk_A'$ with the result of a cryptographic operation performed on the first authentication key $Ak_A$ and the first output bit string $Rk_A$ using Equation (1):

$$h_{AkA}(Rk_A) = h_{AkA}(Rk_A') \tag{1}$$

Here, at step S434, the result of operation performed on the second authentication key $Ak_B$ and the second output bit string $Rk_B$ may be transmitted from the QKD center 100 to the second QKD client device 300 via the classical channel 64.

Here, at step S434, the QKD center 100 may authenticate own identity by comparing the result of a cryptographic operation performed on the second authentication key $Ak_B$ and the second distribution output bit string $Rk_B'$ with the result of a cryptographic operation performed on the second authentication key $Ak_B$ and the second output bit string $Rk_B$ using Equation (2):

$$h_{AkB}(Rk_B) = h_{AkB}(Rk_B') \tag{2}$$

Here, at step S434, the QKD center 100 may authenticate own identity according to Equation (1) and Equation (2).

Figure 11:
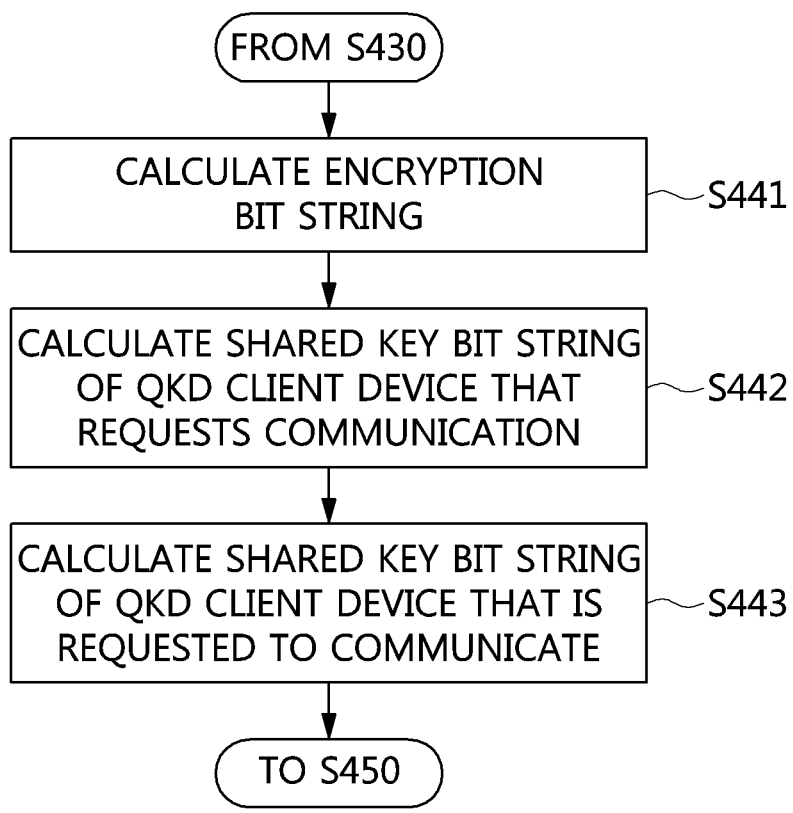
FIG. 11 is a flowchart specifically illustrating an example of the step of calculating a shared key bit string, illustrated in FIG. 8.

FIG. 11 is a flowchart specifically illustrating an example of the process of calculating a shared key bit string, which is illustrated in FIG. 8.

Referring to FIG. 11, at step S440, first, an encryption bit string may be calculated at step S441.

Here, at step S441, only when authentication of the QKD center 100 has succeeded, the encryption bit string may be generated by performing a cryptographic operation on the second authentication key $Ak_B$, the first distribution output bit string $Rk_A'$ and the second distribution output bit string $Rk_B'$ using Equation (3):

$$(Rk_A' \oplus Rk_B') \| h_{AkB}(Rk_A' \oplus Rk_B') \tag{3}$$

where ⊕ may correspond to an XOR operation, ‖ may correspond to a concatenation and $h_{AkB}$ may correspond to a keyed hash function using the second authentication key $Ak_B$.

Here, at step S411, the encryption bit string may be calculated by performing an XOR operation on the first distribution output bit siring $Rk_A'$ and the second distribution output bit string $Rk_B'$, and performing keyed hash function using the second authentication key $Ak_B$.

Also, a shared key bit string of the QKD client device, which requested communication, may be calculated at step S442.

Here, at step S442, the encryption bit string may be transmitted to the QKD client device that requested communication.

Here, at step S442, the encryption bit siring may be transmitted to the second QKD client device 300, which requested the communication, via the classical channel 65.

Here, at step S442, an XOR operation may be performed on the front of the encryption bit string and the second output bit string $Rk_B$ in the second QKD client device 300 using Equation (4):

$$(Rk_A' \oplus Rk_B') \oplus Rk_B \oplus Rk_A') \tag{4}$$

Here, if authentication between the second QKD client device 300 and the QKD center 100 succeeds, because the second distribution output bit string $Rk_B'$ corresponds to the second output bit string $Rk_B$, the first distribution output bit string $Rk_A'$ may be calculated from the XOR operation of Equation (4) at step S442.

Here, at step S442, a shared key bit string may be calculated by performing an XOR operation on the calculated first distribution output bit string $Rk_A'$ and the inter-client authentication key $Ak_{AB}$ shared between the first QKD client device 200, which is requested to communicate, and the second QKD client device 300, which requests communication, using Equation (5):

$$Rk_A' \oplus Ak_{AB} \tag{5}$$

That is, the combination of Equations (3) to (5) may correspond to Equation (6):

$$(\text{INPUT}_{65}) \oplus Rk_B \oplus Ak_{AB} = Rk_A' \oplus Ak_{AB} \tag{6}$$

Here, $\text{INPUT}_{65}$ may correspond to the front of the encryption bit string, which is received from the operation unit 135 of the QKD center 100 via the classical channel 65.

Also, a shared key bit string of the QKD client device, which is requested to communicate, may be calculated at step S443.

Here, at step S443, if authentication between the first QKD client device 200, which was requested to communicate, and the QKD center 100 succeeds, a shared key bit siring may be calculated by performing an XOR operation on the first output bit string $Rk_A$ and the inter-client authentication key $Ak_{AB}$, shared with the second QKD client device 300, which requested the communication, using Equation (7):

$$Rk_A \oplus Ak_{AB} \tag{7}$$

If authentication between the first QKD client device 200, which was requested to communicate, and the QKD center 100 succeeds, the first distribution output bit string $Rk_A'$ of Equation (4) may correspond to the first output bit string $Rk_A$ according to Equation (1).

Accordingly, because the shared key bit string $(Rk_A \oplus Ak_{AB})$, calculated by the operation unit 232 of the first QKD client device 200 according to Equation (7), corresponds to the shared key bit string $(Rk_A' \oplus Ak_{AB})$, calculated by the operation unit 332 of the second QKD client device 300 according to Equation (5), the same encryption key may be shared therebetween.

Figure 12:
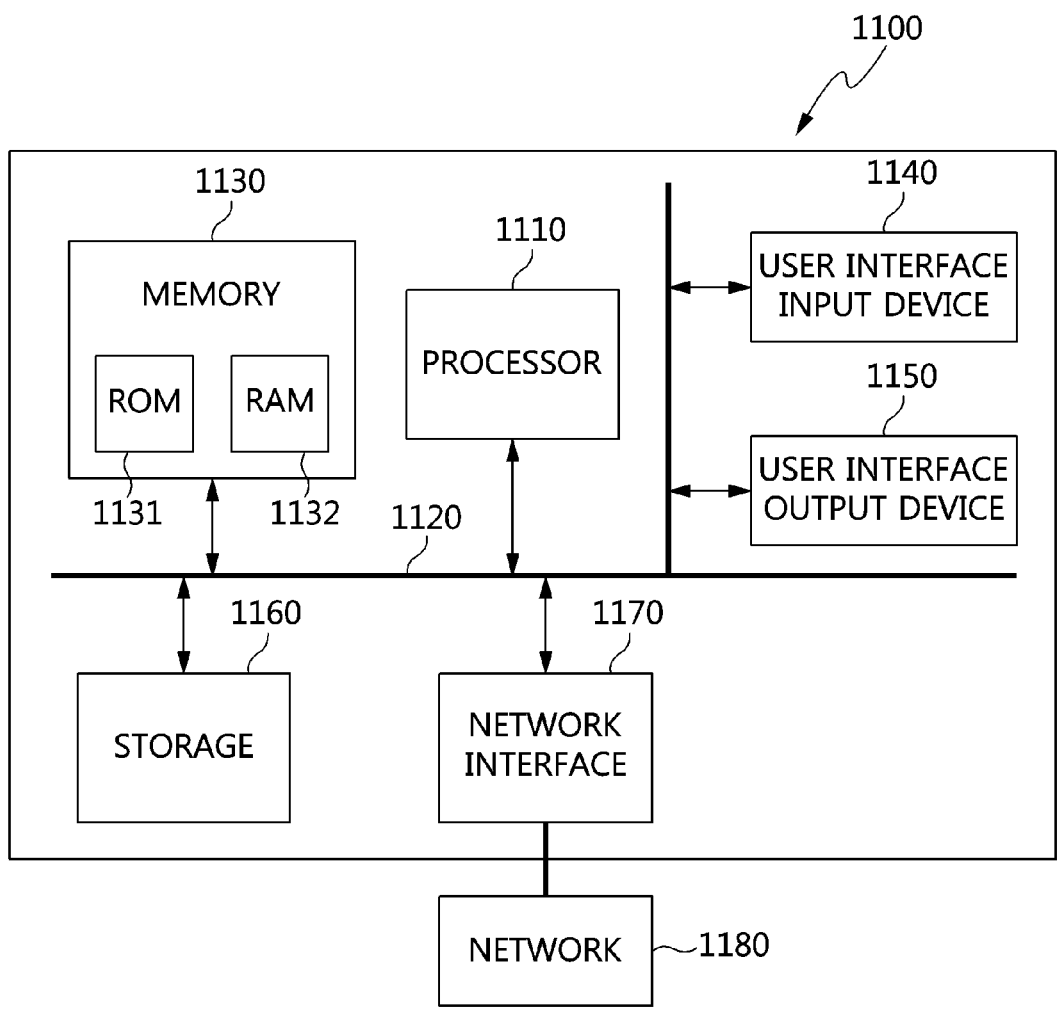
FIG. 12 is a block diagram illustrating a computer system according to an embodiment of the present indention.

FIG. 12 is a block diagram illustrating a computer system according to an embodiment of the present invention.

Referring to FIG. 12, an embodiment of the present indention may be implemented in a computer system 1100, such as a computer-readable recording medium. As illustrated in FIG. 12, the computer system 1100 may include one or more processors 1110, memory 1130, a user interface input device 1140, a user interface output device 1150, and storage 1160, which communicate with each other via a bus 1120. Also, the computer system 1100 may further include a network interface 1170 connected to a network 1180. The processor 1110 may be a central processing unit (CPU) or a semiconductor device for executing processing instructions stored in the memory 1130 or the storage 1160. The memory 1130 and the storage 1160 may be volatile or nonvolatile storage media. For example, the memory may include ROM 1131 or RAM 1132.

The present invention may improve the security of quantum key distribution by preventing information on the encryption of a quantum key, which is finally distributed among QKD client devices, from being exposed to a QKD center.

Also, the present invention may improve the security of quantum key distribution by the process of a cryptographic operation on an authentication key, shared among client devices, and an output bit string in which an error is corrected.

Also, the present invention may distribute a quantum key, encrypted with a hash function having improved security, to users.

As described above, the QKD center and method according to the present invention are not limitedly applied to the configurations and operations of the above-described embodiments, but all or some of the embodiments may be selectively combined and configured so that the embodiments may be modified in various ways.

What is claimed is:

1. A Quantum Key Distribution (QKD) center on a quantum network, comprising:
   one or more processors; and
   a memory having instructions stored thereon executed by the one or more processors to perform;
   an authentication key sharing unit sharing authentication keys with QKD client devices;
   a quantum key generation unit generating sifted keys, corresponding to the QKD client devices, using quantum states;
   an error correction unit generating distribution output bit strings by correcting errors of the sifted keys, wherein the error correction unit corrects the errors of the sifted keys using Hamming code when a length of a block containing the errors becomes the length to which the Hamming code can be applied; and
   a bit string operation unit calculating an encryption bit string by performing a cryptographic operation on the authentication keys and the distribution output bit strings corresponding to the QKD client devices,
   wherein the bit string operation unit transmits the encryption bit string, calculated by performing a cryptographic operation on a second one of the authentication keys $Ak_B$, a first one of the distribution output bit strings $Rk_A{'}$ and a second one of the distribution output bit strings $Rk_B{'}$, to any one of a first one of the QKD client devices and a second one of the QKD client devices only when authentication of the QKD center succeeds, wherein the cryptographic operation is as follows:

$$(Rk_A{'} \oplus Rk_B{'}) \| h_{Ak_B}(Rk_A{'} \oplus Rk_B{'})$$

where $\oplus$ corresponds to an XOR operation, $\|$ corresponds to a concatenation and $h_{Ak_B}$ corresponds to a keyed hash function using the second authentication key $Ak_B$.

2. The QKD center of claim 1, wherein the quantum key generation unit randomly selects bases for quantum states corresponding to the QKD client devices using quantum mechanics, compares measurement bases for quantum states received from the QKD client deices, and generates sifted keys corresponding to bits that remain after checking security of a channel using bits on the same basis for the respective QKD client devices.

3. The QKD center of claim 1, wherein the bit string operation unit is configured to prove the identity of the QKD center by transmitting a result of a cryptographic operation performed on a first one of the authentication keys and a first one of the distribution output bit strings to a first one of the QKD client devices.

4. The QKD center of claim 1, wherein the bit string operation unit is configured to prove the identity of the QKD center by transmitting a result of a cryptographic operation performed on a second one of the authentication keys and a second one of the distribution output bit strings to a second one of the QKD client devices.

5. A Quantum Key Distribution (QKD) client device on a quantum network, comprising:
   one or more processors; and
   a memory having instructions stored thereon executed by the one or more processors to perform;
   an authentication key sharing unit sharing authentication keys with a QKD center and an additional QKD client device;
   a quantum key generation unit generating a sifted key, corresponding to the QKD center, using quantum states;
   an error correction unit generating distribution output bit strings by correcting an error of the sifted key in conjunction with the QKD center, wherein the error correction unit corrects the errors of the sifted keys using Hamming code when a length of a block containing the errors becomes the length to which the Hamming code can be applied;
   a bit string calculation unit calculating a shared key bit string by performing a cryptographic operation on one or more of a first distribution output bit string of the distribution output bit strings, a second distribution output bit string of the additional QKD client device, an inter-client authentication key, which is included in the authentication keys and is shared with the additional QKD client device, and an encryption bit string received from the QKD center, and
   a privacy amplification unit generating a final key bit string by applying a hash function to the shared key bit string,
   wherein, only when the authentication succeeds and the QKD client device requests the QKD center to communicate, the bit string calculation unit receives the encryption bit string, which is calculated by performing a cryptographic operation on a second authentication key included in the authentication keys, the first distribution output bit string and the second distribution output bit string, the first distribution output bit string being generated by correcting an error of the sifted key in the QKD center, and the second distribution output bit string being generated by correcting an error of a sifted key of the additional QKD client device in the QKD center,
   wherein the cryptographic operation is as follows:

$$(Rk_A{'} \oplus Rk_B{'}) \| h_{Ak_B}(Rk_A{'} \oplus Rk_B{'})$$

where $\oplus$ corresponds to an XOR operation, $\|$ corresponds to a concatenation and $h_{Ak_B}$ corresponds to a keyed hash function using the second authentication key $Ak_B$.

6. The QKD client device of claim 5, wherein the quantum key generation unit selects a measurement basis for a quantum state corresponding to the QKD center using quantum mechanics, compares a preparation basis for a quantum state, received from the QKD center, and generates the sifted key, the sifted key corresponding to bits that remain after checking security of a channel using bits on the same basis.

7. The QKD client device of claim 5, wherein the bit string calculation unit authenticates the QKD center to a first QKD client device by comparing a result of a cryptographic operation performed on a first authentication key, which is shared with the first QKD client device, and the first distribution output bit string with a result of a cryptographic operation performed on the first authentication key and the first distribution output bit string, the first authentication key being included in the authentication keys, the first distribution output bit string being included in the distribution output bit strings, and the first output bit string being included in the output bit strings.

8. The QKD client device of claim 5, wherein the bit string calculation unit authenticates the QKD center to a second QKD client device by comparing a result of a cryptographic operation performed on a second authentication key, which is shared with the second QKD client device, and the second distribution output bit string with a result of a cryptographic operation performed on the second authentication key and the second distribution output bit string, the second authentication key being included in the authentication keys, the second distribution output bit string being included in the distribution output bit strings, and the second output bit string being included in the output bit strings.

9. The QKD client device of claim 5, wherein the privacy amplification unit deletes some of information about a key, leaked to an eavesdropper in the process of error correction.

10. The QKD client device of claim 5, wherein, only when the authentication succeeds and the QKD client device requests the QKD center to communicate, the bit string calculation unit calculates an encrypted shared key by performing a cryptographic operation on the encryption bit string, the second authentication key and the second distribution output bit string.

11. The QKD client device of claim 10, wherein, only when the authentication succeeds and the QKD client device requests the QKD center to communicate, the bit string calculation unit calculates the shared key bit string by performing a cryptographic operation on the encrypted shared key and the inter-client authentication key.

12. The QKD client device of claim 10, wherein, only when the authentication succeeds and the QKD client device is requested to communicate by the QKD center, the bit siring calculation unit calculates the shared key bit string by performing a cryptographic operation on the first distribution output bit string and the inter-client authentication key.

13. A quantum key distribution (QKD) method on a quantum network, comprising:
sharing authentication keys among a QKD center and a plurality of QKD client devices;
generating sifted keys, corresponding to the QKD center and the QKD client devices, using quantum states;
generating output bit strings by correcting errors of the sifted keys, wherein the errors of the sifted keys are corrected using Hamming code when a length of a block containing the errors becomes the length to which the Hamming code can be applied;
calculating a shared key bit string by performing a cryptographic operation on the output bit strings and an inter-client authentication key; and
generating a final key bit string by applying a hash function to the shared key bit string,
wherein the encryption bit string is calculated by performing a cryptographic operation on a second one of the authentication keys AkB, a first one of the distribution output bit strings $Rk_A'$ and a second one of the distribution output bit strings $Rk_B'$, to any one of a first one of the QKD client devices and a second one of the QKD client devices only when authentication of the QKD center succeeds, wherein the cryptographic operation is as follows:

$$(Rk_A' \oplus Rk_B') \| h_{AkB}(Rk_A' \oplus Rk_B')$$

where $\oplus$ corresponds to an XOR operation, $\|$ corresponds to a concatenation and $h_{AkB}$ corresponds to a keyed hash function using the second authentication key $Ak_B$.

14. The QKD method of claim 13, wherein the generating the sifted keys comprises selecting a preparation basis and a measurement basis for a quantum state using quantum mechanics, comparing a preparation basis of the QKD center with measurement basis of the QKD client devices, and generating the sifted keys corresponding to bits that remain after checking security of a quantum channel using bits on the same basis.

15. The QKD method of claim 13, wherein the calculating the shared key bit string comprises:
calculating an encryption bit string by the QKD center,
calculating, by a QKD client device of the plurality of QKD client devices that requests communication, the shared key bit string, and
calculating, by a QKD client device of the plurality of QKD client devices that is requested to communicate, the shared key bit string.

* * * * *